United States Patent
Haneda et al.

(10) Patent No.: US 6,204,932 B1
(45) Date of Patent: *Mar. 20, 2001

(54) IMAGE FORMING APPARATUS

(75) Inventors: Satoshi Haneda; Kunio Shigeta; Kiyoshi Kimura, all of Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/081,514

(22) Filed: May 20, 1998

(30) Foreign Application Priority Data

May 26, 1997 (JP) .................................... 9-135224

(51) Int. Cl.[7] ............... G06K 15/14; H04N 1/29; H04N 1/387; H04N 1/40; H04N 1/60
(52) U.S. Cl. .................. 358/1.9; 358/1.16; 358/1.18; 399/309
(58) Field of Search .................. 358/1.16, 1.9, 358/443, 444, 447, 448, 453, 451, 1.18, 300; 382/274, 302, 305, 307, 277, 298, 232; 399/38, 53, 364, 66, 306, 309, 401, 402

(56) References Cited

U.S. PATENT DOCUMENTS

| | | | |
|---|---|---|---|
| 3,697,171 | * 10/1972 | Sullivan | 430/126 |
| 4,076,407 | * 2/1978 | Place, Jr. | 399/314 |
| 5,046,166 | * 9/1991 | Takayanagi | 358/300 |
| 5,638,498 | * 6/1997 | Tyler et al. | 358/1.18 |
| 5,644,403 | * 7/1997 | Watanabe | 358/296 |
| 5,703,628 | * 12/1997 | Nishiyama | 345/202 |
| 5,721,811 | * 2/1998 | Eckhardt et al. | 358/1.9 |
| 5,761,573 | 6/1998 | Haneda et al. | 399/66 |
| 5,901,278 | * 5/1999 | Kurihara et al. | 358/1.15 |

FOREIGN PATENT DOCUMENTS 62-157070    7/1987   (JP).

* cited by examiner

*Primary Examiner*—Scott Rogers
(74) *Attorney, Agent, or Firm*—Frishauf, Holtz, Goodman, Langer & Chick, P.C.

(57) ABSTRACT

In an image forming apparatus, a document image is read by an image scanner and image data are applied with image processing and stored in a memory. An image correction device corrects the image data with a different correcting condition depending on whether the image data are used for a toner image on the obverse side of the sheet or for a toner image on the reverse side of the sheet. A fixing device fixes the toner images on the obverse side and the reverse side of the sheet simultaneously.

25 Claims, 17 Drawing Sheets

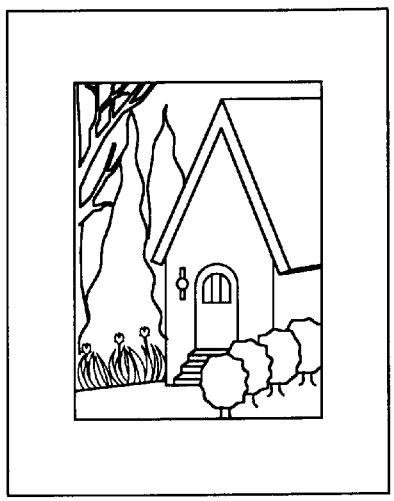
FIG. 8 (a)   ORIGINAL SAMPLE: A
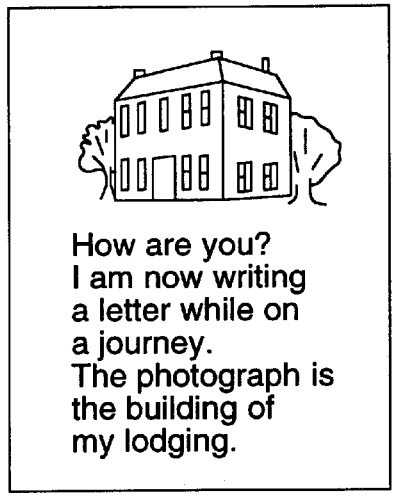
FIG. 8 (b)   ORIGINAL SAMPLE: B
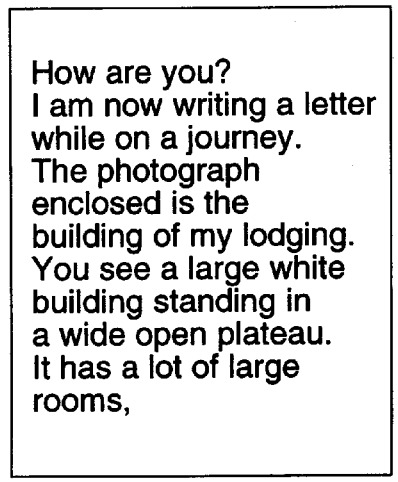
FIG. 8 (c)   ORIGINAL SAMPLE: C

ORIGINAL SAMPLE: A

▤ PHOTOGRAPH PORTION

ORIGINAL SAMPLE: B

▥ LETTER PORTION

ORIGINAL SAMPLE: C

FIG. 13

Compression Mode

Mode1:Image Up+2

Mode2:Image Up+1

Mode3:Standard Mode

Mode4:Memory Up+1

Mode5:Memory Up+2

| Memory Of Compression Mode | |
|---|---|
| Mode1:Image Up+2 | ※※% |
| Mode2:Image Up+1 | ※※% |
| Mode3:Standard Mode | ※※% |
| Mode4:Memory Up+1 | ※※% |
| Mode5:Memory Up+2 | ※※% |

B42

IMAGE FORMING APPARATUS

BACKGROUND OF THE INVENTION

This invention relates to a n image forming apparatus, and in particular, to an image forming apparatus in which an image of an original document is read by photoelectric conversion, the image data read by photoelectric conversion are once memorized and kept to be read out selectively, and the image forming on both sides of a recording member can be made on the basis of said read out image data.

It is known heretofore a digital copying machine which has a structure such that an original document is scanned optically to obtain an optical image, which is received and converted by a photoelectric conversion element such as a line image sensor into an electrical signal, the electrical signal further digitalized, the digitalized image signal is then subjected to the image processing such as re-sizing processing, filter processing, and γ correction processing, and a latent electrostatic image is formed on a photoreceptor by a laser beam modulated on the basis of said image-processed image signal (TOKKAISHOU 62-157070).

In the meantime, the images which are supposed to be the original in the above-mentioned digital copying machine, are of many kinds and varieties, and the typical ones are a letter image, a photographic image, and a mixed image of both the letter and photograph type. Accordingly, on the occasion of every kind of image processing for the read image information, the kind of the image is discriminated and the image processing having the characteristics in accordance with the kind according to the discrimination result is carried out.

Further, in the usual image forming apparatus capable of forming images on both sides of a transfer member, the toner images are formed on its both sides by repeating the process of fixing the image on its one side, hence the image processing corresponding to the front or reverse side is made in the same manner regardless of whether the side is front or reverse.

Now, the digital copying machine capable of double-sided copying related to this invention is one such that the toner images are formed on both sides of the transfer member, then fixed together at the same time, and the series of operations consisting of reading, image discrimination, image processing, image forming on both sides of the transfer member (printing) are usually carried out in real time, further in the case where plural copies are made from an original, each original page is read the same number of times as the number of copies and the image processing as well as printing operation is repeated for every reading operation.

Accordingly, in the case where plural copies are made from an original of plural pages by repeating the process of making one copy for each page, the method such that the original sheet for which image reading is once finished is recirculated to the image reading portion by an automatic document feeder (ADF) is employed. The apparatus for recirculating the original sheets to make one copy for each of them, so that one set of copies may be completed followed by another, is generally called a recirculating document handler (RDH).

In this case, where plural sets of copies are made from an original, it is inevitable to repeat the copying operation the number of times of copies, but repeated reading of the same original pages for each copying cycle hinders a high-speed processing, and in particular, in the case of operating the recirculating document handler (RDH), the time for copying is increased by the transporting operation for the original sheets to be done for each reading process, and further the structure of the recirculating document handler becomes complicated.

On the other hand, with recent reductions in the cost memory circuits, it has become possible to actualize the copying machine provided with a memory circuit for memorizing the image data. Then, by making said memory circuit memorize and output collectively the read data of the plural images of the original, the inefficient repeating of reading operation for each of the original sheets can be omitted, and in particular, in the case where plural copies are made from an original of plural pages by repeating the process of making one copy for each page, a high-speed processing becomes possible.

On the other hand, because the number of times of executing a transfer process for the reverse side image is different from that for the front side, it is necessary that image processing should be made in a manner such that the print qualities of both the front and reverse sides are not different from each other.

Further, if the memory circuit is made up in such a manner as to be divided into page units (image units), it raises a problem that the memory capacity can not be utilized effectively because of many useless memory portions, although it makes reading-out of the image data easy. Still further, in some cases, copies are desired to be made from a double-sided original, for example, of A4 size to one side of A4 size of copy paper sheet, or from a single-sided original of A4 size to both sides of copy paper sheet of A4 size, and further, for example, images on a double-sided original of A4 size are desired to be copied onto the one side of A3 sized copy paper sheet in a side-by-side manner. Then, in the method of making the image data of the plural page original to be memorized in said memory circuit, it is desired that the processing concerning whether the image is for the front side or the reverse side and the processing for the development of images of A4 size to A3 size as the above-mentioned can be carried out easily. In other words, if the memorized image data are already specified as those for the front side or for the reverse side, it will raise a problem on the occasion of changing the mode of original input and copy output.

U.S. patent application Ser. No. 08/821,878 (now U.S. Pat. No. 5,761,573 issued Jun. 2, 1998) teaches an image forming apparatus in which a processing condition or an image data correcting method for a reverse side toner image is different from those for an obverse side toner image, the reverse side toner image and the obverse side toner image are formed on a reverse side and an obverse side of a sheet and fixed simultaneously. However, this application teaches nothing about a technique in which a document image is read by an image reading apparatus, after image signals are stored in a memory, image data are read from the memory and subject to image correction processing for a reverse side toner image and image correction processing for an obverse side toner image separately, and then the reverse side toner image and the obverse side toner image are formed.

If the image data for a reverse side toner image and the image data for an obverse side toner image are stored in the memory after original image were converted, it may be difficult to follow a change in output format such as a change between a single side image formation mode and a both side image formation mode. Further, if all image data processing are separated for a reverse side toner image and for an obverse side toner image, a working load on a CPU to do the image data processing becomes too heavy and a control for them becomes complicated.

As is described in the foregoing, the filter processing and γ correction are generally executed with different characteristics depending on the kind of the original, while in the facsimile apparatus the method of data compression and compression rate are made to be changed for each kind of originals.

Further, on this occasion, because the number of times of executing a transfer process for the reverse side image is different from that for the front side, it is necessary that image processing should be made in a manner such that the print qualities of both the front and reverse sides are not different from each other.

For this reason, there has been a problem that the image memory circuit is made to be complicated, because, in the case where a digital copying machine is provided with a memory circuit for memorizing the compression-processed image data in said memory circuit, if the aforesaid compression processing technology depending on the kind of the image is employed as it is, it becomes necessary that such sets of information as the information on discrimination of the images, the information on the method of compression applied, and the information on the division of the image area for the images with mixed presence of photographs and letters are memorized as well as the image data.

On the occasion of memorizing the image data in the memory circuit, it is required to execute the image compression processing in order to utilize the memory capacity efficiently, but in some cases the user has a preference for an increase of the number of original pages to be memorized over the image quality, and some other cases the user has preference for a high image quality to be obtained over the number of pages to be memorized, thus it has been desired to provide an apparatus capable of coping with such difference in the requirements.

Further, there has been also a problem that if the whole area of the image to be read is made the object of reading regardless of the original size and the recording paper size, it means that the image data of the blank spaces which are not necessary to be memorized and the image data not to be used in the image forming are memorized uselessly, resulting in the waste of the memory capacity.

In the meantime, some digital copying machines have a function to make image forming on the basis of the image data inputted from an external apparatus (function as a general printer), and in the case where a copying machine has such a function as mentioned above, it generally comprises a buffer memory in order to adjust the timing relationship between the image data input from the external apparatus and the image forming in the copying machine. However, it is a problem that the circuit structure becomes complicated for the reason of having separate memory circuits for every function if it has separately a buffer memory for memorizing the image data in a similar manner in addition to the memory circuit for memorizing and storing the image data as mentioned above.

SUMMARY OF THE INVENTION

This invention is made in view of the above-mentioned situation, and an object of the invention is to provide an image forming apparatus capable of following any change in output format, and another objective of the present invention is to provide an image forming apparatus which employs a memory circuit with a simple structure capable of memorizing the image data and forms the toner images on both sides of a transfer member and then fixes them at the same time, thus enabling the realization of a high-speed processing.

Another object of the invention is to provide an image forming apparatus which forms the toner images on both sides of a transfer member and then fixes them at the same time, said image forming apparatus being capable of coping with a difference in requirements depending on the user, by enabling the user to specify optionally the compression rate for the compression processing prior to memorizing the image data in the memory circuit.

A further object of the invention is to provide an image forming apparatus which forms the toner images on both sides of a transfer member and then fixes them at the same time, said image forming apparatus achieving the effective utilization of the memory circuit for memorizing the image data, by making it possible to avoid memorizing the image data outside the original image and the image data not to be used in the image forming process.

Another object of the invention is to provide an image forming apparatus which forms the toner images on both sides of a transfer member and then fixes them at the same time, said image forming apparatus being capable of accepting the input of the image data from an external apparatus with a simple memory circuit, making it unnecessary for the apparatus to be provided with a memory circuit for adjusting the timing exclusively in case of the real-time image forming on the basis of the inputted image data from an external apparatus.

A further object of the invention is to provide an image forming apparatus which forms the toner images on both sides of a transfer member and then fixes them at the same time, said image forming apparatus having a structure such that the image data are continuously memorized in a memory circuit, further making it easy to read out selectively the image data memorized in such a manner, so as to enable, for example, the development of the images on a double-sided original of A4 size to one side of an A3-sized original in a simple manner.

The above objects of the invention are accomplished by an image forming apparatus comprising:

image reading means for reading a document image and for obtaining image data;

a first image carrying member;

toner image forming means for forming toner images on the first image carrying member;

a second image carrying member onto which the toner image is transferred from the first image carrying member;

a first transfer member for transferring the toner image from the first image carrying member to a first side of a sheet;

a second transfer member for transferring the toner image from the second image carrying member to a second side of the sheet;

fixing means for fixing the toner images on the both sides of the sheet;

image processing means for applying image processing onto the image data obtained by the image reading means;

a memory for storing the image data, wherein the image data are stored in the memory after the image data are applied with the image processing;

image correcting means for receiving the image data from the memory, for correcting the image data so as to obtain output data in accordance with whether the image data are used for the toner image on the first side of the sheet or for the toner image on the second side of the sheet, wherein the image correcting means corrects the image data with different correcting condition whether the image data are used for the toner image on the first side of the sheet or for the toner image on the second side of the sheet; and the toner image forming means forming the toner images on the first image carrying member on the basis of the output data.

Further, the above object can be attained by the following preferable structures.

An image forming apparatus, comprising:

a reading means for reading an original image by photoelectric conversion to obtain image data, an image processing means executing image processing for the image data obtained by said reading means to obtain the image data in the final output state, an image data memorizing means for memorizing the image data subjected to the image processing by said image processing means, an image correction means for executing image correction corresponding to the output mode of front/reverse side for the image data selectively read out from said image data memorizing means, a first image bearing means for bearing the toner images formed by a toner image forming means on its surface, a second toner image bearing means for bearing again the toner images transferred altogether onto said second image bearing means, said toner images having been borne by said first image bearing means, a first transfer means for transferring the toner images borne by said first image bearing means onto one side of a transfer member, a second transfer means for transferring the toner images borne by said second image bearing means onto the other side of said transfer member, and a fixing means for fixing the toner images transferred onto both sides of said transfer member.

An image forming apparatus comprising:

a reading means for reading an original image by photoelectric conversion to obtain image data, a compression processing means executing compression processing for the image data read by said reading means, an image data memorizing means for memorizing the image data subjected to the compression processing by said compression processing means, a compression rate specifying means for specifying the compression rate in compression processing by said compression processing means, a compression rate varying means for making the variable setting of the compression rate in said compression processing means in accordance with the compression rate specified by said compression rate specifying means, an expansion processing means for executing expansion processing for the image data read out selectively from said image memorizing means, an image forming means for carrying out image forming on the basis of the image data subjected to the compression processing by said compression processing means, an image correction means for executing image correction corresponding to the output mode of front/reverse side for the image data selectively read out from said image data memorizing means, a first image bearing means for bearing the toner images formed by a toner image forming means on its surface, a second toner image bearing means for bearing again the toner images transferred altogether onto said second image bearing means, said toner images having been borne by said first image bearing means, a first transfer means for transferring the toner images borne by said first image bearing means onto one side of a transfer member, a second transfer means for transferring the toner images borne by said second image bearing means onto the other side of said transfer member, and a fixing means for fixing the toner images transferred onto both sides of said transfer member.

An image forming apparatus comprising:

a reading means for reading an original image by photoelectric conversion to obtain image data, an effective image area detecting means for detecting an effective image area in the image data read by said reading means, an effective area extracting means for extracting the image data only in said effective image area detected by said effective image area detecting means out of the image data read by said image reading means to output, an image data memorizing means for memorizing the image data extracted by said effective area extracting means, an image correction means for executing image correction corresponding to the output mode of front/reverse side for the image data selectively read out from said image data memorizing means, a first image bearing means for bearing the toner images formed by a toner image forming means on its surface, a second toner image bearing means for bearing again the toner images transferred altogether onto said second image bearing means, said toner images having been borne by said first image bearing means, a first transfer means for transferring the toner images borne by said first image bearing means onto one side of a transfer member, a second transfer means for transferring the toner images borne by said second image bearing means onto the other side of said transfer member, and a fixing means for fixing the toner images transferred onto both sides of said transfer member.

An image forming apparatus comprising:

an image data inputting means for inputting image data from an external apparatus, a reading means for reading an original image by photoelectric conversion to obtain image data, an image data memorizing means for memorizing said image data, an image forming means for carrying out image formation on the basis of said image data, a first output control means for making said image memorizing means memorize and store the image data read by said reading means in said image data memorizing means to output the image data selectively read out from said image memorizing means to said image forming means, a second output control means for making said image memorizing means temporarily memorize the image data inputted by said image data inputting means for the purpose of adjusting the timing relationship between the image data inputted by said image data inputting means and said image forming means to output the image data successively read out from said image memorizing means to said image forming means so that the images inputted from said external apparatus may be formed in real time, an image correction means for executing image correction corresponding to the output mode of front/reverse side for the image data selectively read out from said image data memorizing means, a first image bearing means for bearing the toner images formed by a toner image forming means on its surface, a second toner image bearing means for bearing again the toner images transferred altogether onto said second image bearing means, said toner images having been borne by said first image bearing means, a first transfer means for transferring the toner images borne by said first image bearing means onto one side of a transfer member, a second transfer means for transferring the toner images borne by said second image bearing means onto the other side of said transfer member, and a fixing means for fixing the toner images transferred onto both sides of said transfer member.

An image forming apparatus comprising:
a reading means for reading an original image by photoelectric conversion to obtain image data, an image data memorizing means for memorizing said image data, a memory area data memorizing means for memorizing the data indicating the memory area for each image in said image data memorizing means, a memory control means for making said image data memorizing means continuously memorize the image data read by said reading means while making said memory area data memorizing means memorize the data indicating the area wherein the images are memorized by said image data memorizing means each for each image, an image reading-out means for reading out selectively and outputting the image data from said image data memorizing means with reference to said memory area data memorizing means, an image correction means for executing image correction corresponding to the output mode of front/reverse side for the image data selectively read out from said image data memorizing means, a first image bearing means for bearing the toner images formed by a toner image forming means on its surface, a second toner image bearing means for bearing again the toner images transferred altogether onto said second image bearing means, said toner images having been borne by said first image bearing means, a first transfer means for transferring the toner images borne by said first image bearing means onto one side of a transfer member, a second transfer means for transferring the toner images borne by said second image bearing means onto the other side of said transfer member, and a fixing means for fixing the toner images transferred onto both sides of said transfer member.

BRIEF DESCRIPTION OF THE DRAWINGS

FIGS. 8(a) to 8(c) are drawings showing examples of originals as the objects of reading;

FIG. 13 is a drawing showing the state of display when the compression rate is specified;

FIG. 14 is a drawing showing the state of display when the compression rate is specified;

DETAILED DESCRIPTION OF THE PREFERRED EMBODIMENT

Figure 1:
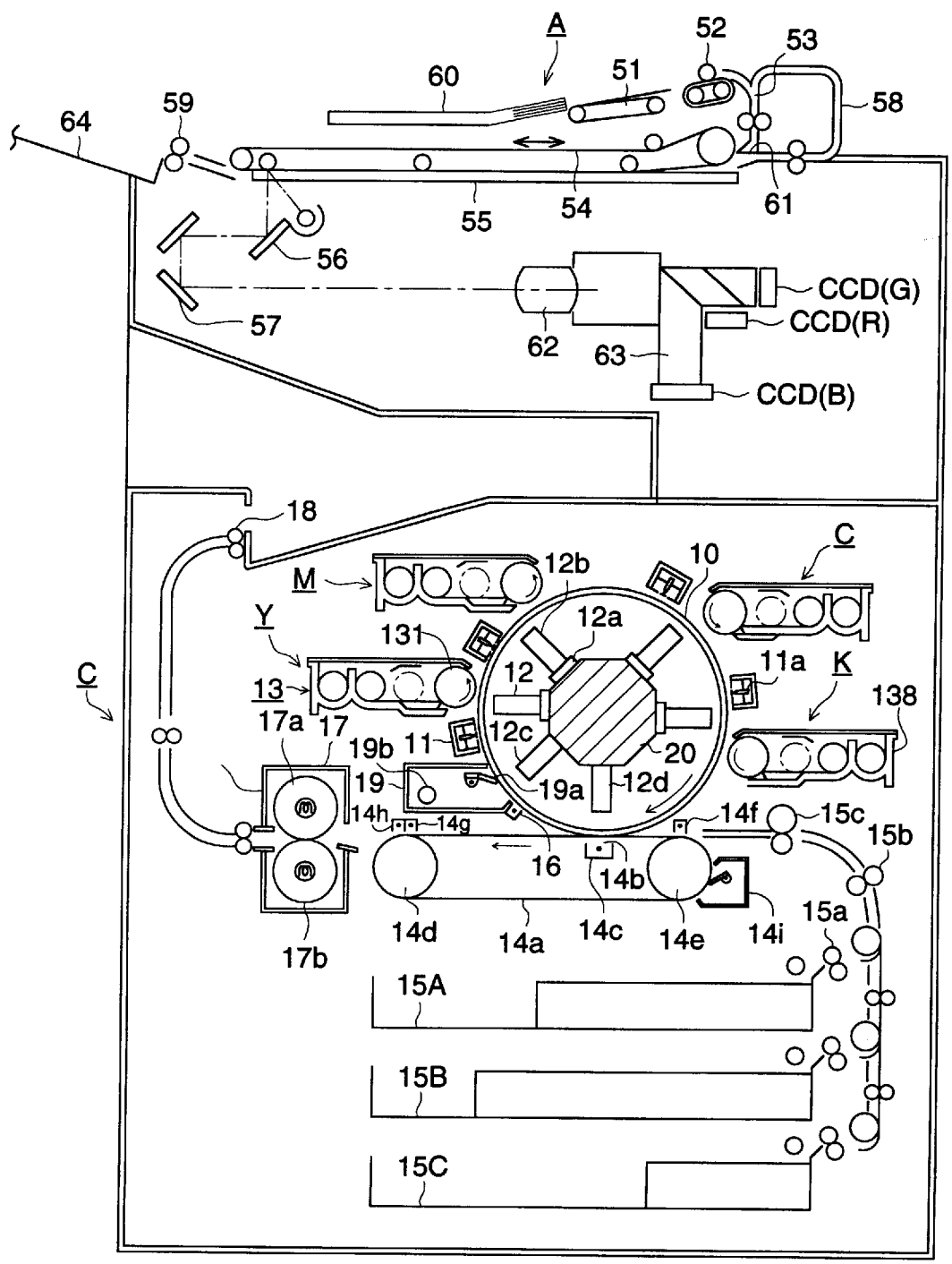
FIG. 1 is a cross-sectional view showing the structure of the image forming apparatus of this invention.

The image forming apparatus of this invention is the one which is capable of forming images on both sides of a transfer member comprising a first image bearing means for bearing the toner images formed on its surface by a toner image forming means, a second image bearing means for bearing again on its surface the toner images which have been borne by said first image bearing member and altogether transferred onto said second image bearing member, a first transfer means for transferring the toner images borne on said first image bearing means onto one surface of said transfer member, a second transfer means for transferring the toner images borne on said second image bearing means onto the other surface of said transfer member, and a fixing means for fixing both of the toner images transferred onto one and the other sides of said transfer member respectively, said image forming apparatus further having a structure such that the image data are obtained by reading an image of an original through photoelectric conversion, and then subjected to predetermined image processings by image processing means to obtain the image data in the state of final output, which are memorized in a image data memory means, and the image forming means carries out image forming on the basis of the image data which are selectively read out from said image data memory means.

According to the image forming apparatus having such structure as mentioned above, in the image forming apparatus in which image forming is made on the basis of the image data obtained by reading an original image through photoelectric conversion, the image data being made to be in the state of final output are memorized and kept in the image data memory means, and image forming on both sides of the transfer member is carried out on the basis of the image data selectively read out of the memorized data. In other words, the image data after image processing, which are supposed to be directly outputted to the image forming means in real-time processing, are memorized and kept in the image data memory means in the state immediately before the output to the image forming means, and can be made to be read out optionally and outputted to the image forming apparatus after image correction on the basis of the output mode regarding the front/reverse side. That is, because the image data are corrected on occasion in such a manner as to be appropriate to the front/reverse side mode, the data can correspond to the change of the output modes (from double-sided to single-sided copy, from single-sided to double-sided copy, from stacking to sorting, etc.) flexibly.

Now, in the aforesaid image processing, characteristics of the image processing can be changed corresponding to the kind of the original image, and due to memorizing the image data after image processing, it can be made unnecessary to memorize the information such as the kind of the image on the occasion of memorizing the image data while the best image processing appropriate to the kind of the image is made.

Further, in the case where the characteristics of the image processing are changed corresponding to the kinds of the original images, if they are discriminated and classified to the letter image and photograph image, the image processing can cope with the different requirement for each of them.

Further, by making the image data memory means for memorizing the image-processed image data memorize only the image data without memorizing the information such as the kind of the image other than the image data, the memory capacity of the memory means can be utilized efficiently.

Furthermore, by making the image data memory means memorize the image data after compression processing and executing the expansion processing on the occasion of reading out the image data from said memory means, it is possible to make the memory means memorize more images.

On the other hand, in the case where the read image data are subjected to the compression processing and made to be memorized in the memory means, by making the rate of compression in said compression processing to be specified optionally, it can be met the requirement for the rate of compression which becomes different depending on the user and the original image.

On the occasion of specifying the rate of compression as mentioned above, it makes the specifying of the rate of compression easy to do, while considering the image quality, to select any one out of the following modes, that is, the mode of standard rate of compression, the mode of priority for image quality, and the mode of priority for rate of compression.

In this case, the operational performance in specifying the mode can be made high if the standard rate mode among the three is made to be specified prior to others.

Further, it is appropriate for specifying the rate of compression to be made by specifying the numerical value of the rate of compression, and in this manner the requirement for the closely different rate of compression can be met.

In the image forming apparatus having the structure such that the image data subjected to the compression processing in accordance with the rate of compression specified in the above-mentioned manner are memorized, the image data read out from the memory means are expanded and further subjected to the image processing corresponding to the output mode with regard to the front/reverse side having the function to make the image processing prior to the image forming which is to be carried out on the basis of the image data thus processed, it can make image forming for double-sided or single-sided copies on the basis of the image data which have been stored as the image data obtained by compressing the original image data in the specified rate of compression, by reading them out selectively on occasion.

Further, on the occasion of memorizing the read data in the image data memory means, by detecting the effective image area from the image data and memorizing only the image data in said detected effective area, it can be avoided that the unnecessary data such as those for the blank space and those not available for image forming are memorized.

In the case where the size of the recording paper used in image forming is fixed, the portion of the original image which is supposed to be positioned outside said recording paper is an ineffective portion for memorizing, and only the portion corresponding to said size of the recording paper is regarded as the effective image area. On the other hand, in the case where the size of the original image is known, the portion read for the area exceeding the size of the original is regarded as the blank space and only the portion corresponding to the size of the original is the effective image area.

When the image data in the effective image area only is to be extracted, it is necessary to judge whether the position of each particular pixel is in the effective image area or not, by comparing the coordinate data indicating the position of said particular pixel in the image data with the defined coordinate data corresponding to the effective image area.

In the case where the image forming apparatus is provided with the means for inputting the image data from the external apparatus, as well as the means for obtaining the image data by reading the original image, and provided also with the image data memory means for memorizing and storing the image data, when the image forming is made in real time on the basis of the image data inputted from the external apparatus, said inputted image data is made to be temporarily memorized in said memory means so that the discrepancy between the timing of the input of the image data from the external apparatus and that of the image forming may be corrected. Hence it is not necessary that the image forming apparatus is provided with another memory means for functioning as the buffer memory in addition to the image data memory means for memorizing and storing the image data.

In this case, if the memory is made to have a structure such that the memory area for memorizing and storing the image data is commonly used also for the buffer memory, the portion of free area for memorizing and storing the image data can be utilized as the buffer memory, resulting in an effective use of the memory area.

Further, by providing a means for memorizing the data indicating the memory area for every image in the image data memory means so that the image data may be memorized continuously in the image data memory means and further read out on the basis of the result of reference to said data indicating said memory area, it is unnecessary to divide the image area beforehand into image units and the memory capacity is efficiently utilized, and it is easily done to read out the image data even in the changed order.

If the aforesaid data for indicating the memory area is expressed by the top address of each image in the image data memory means, it can be made easy to read out the image data from the image data memory means. Further, if the image forming apparatus has a structure such that the plural images can be read out successively on the basis of said data indicating the memory area, it can be easily made to develop a double-sided original of A4 size to an original of A3 size.

From now on, the explanation of an embodiment of this invention will be given. FIG. 1 is a drawing showing the whole structure of the hardware in a color image forming apparatus of digital type capable of forming double-sided images. However, this invention is not confined to the image forming apparatus capable of forming the color images on both sides of a transfer member, and it may be applied also to a digital monochromatic copying machine capable of forming double-sided images.

In this FIG. 1, the color image forming apparatus is composed of the image reading portion A, the image processing portion B (not shown in the drawing), and the image forming portion C; said image reading portion A corresponds to the image reading means, said image processing portion B corresponds to the image processing means, and said image forming portion C corresponds to the image forming means.

The image reading portion A is capable of reading the images recorded on both sides of an original, and in the image reading portion A the sheets of the original 60 are stacked, their front sides facing downward, in the order of pages from the lowermost first sheet, and the lowermost sheet D is conveyed out of the stack to the transport path 53 by the action of the conveyor belt 51 and the pick off roller 52. The conveyed original sheet 60 moves the guide plate 61, which is urged to the position shown by the solid line, away to retract it to the position shown by the broken line, and is fed onto the transparent glass platen 55 by the transport belt 54, then is stopped for a while at the position for reading, its reverse side facing down.

The image on the reverse side of the sheet of the original 60 on the glass platen 55 is read by means of the scanning optical system comprised of the first mirror unit 56 composed of the illuminating lamp and the first mirror, and the second mirror unit 57 composed of the second mirror and the third mirror both placed in V-shaped position, through the motion for reading with the velocity V of the first mirror unit 56 and the motion for exposure in the same direction with the velocity V/2 of the second mirror unit, and focused on the light receiving surface of the three line image sensor CCD's through the projection lens 62 and the dichroic prism 63. Each of color-separated line-shaped optical images focused on the image sensor CCD's, is converted seriatim into an electric signal (brightness signal).

When reading the image on the reverse side is finished in the image reading portion A, the sheet of the original 60 is inverted reverse to front through the inverting transport path 58 by the temporary reverse revolution of the transport belt 54, is fed again onto the glass platen 55 through the transport path 53 by the transport belt 54, and is stopped for a while at the position for reading the original, its front side facing down.

The front side image of the sheet of the original 60 on the glass platen 55 is read by the aforesaid scanning optical system, separated into three color images, and each of them is photoelectrically converted into an electric signal by the corresponding image sensor CCD.

The sheet of the original 60, for which the reading of the images on both sides are finished, is then discharged onto the tray 64 through the discharging roller 59 by the action of transport belt 54, stacked in the order of pages from the lowermost first page, its front side facing downward.

The image signal of the original image (image data) read in the image reading portion A is then subjected to the every kind of image processing such as brightness/density conversion, filter processing, re-size processing, γ correction, correction processing for front/reverse image in the image processing portion B to be described later, and is outputted to the image forming portion C.

In the image forming portion C, the LED printer employing the electrophotographic technology carries out the image forming on sheets of recording paper in accordance with the inputted image signal.

In the image forming portion C, the photoreceptor drum 10, the first image bearing member, is composed of a cylindrical substrate member made up of a transparent member made of, for example, an optical glass or a transparent acrylic resin provided inside, a transparent conductive layer, and a photosensitive layer such as an a-Si layer or an organic photoconductor (OPC) layer provided on its outer circumferential surface, and is rotated clockwise as shown in FIG. 1 in the electrically grounded state.

Figure 2:
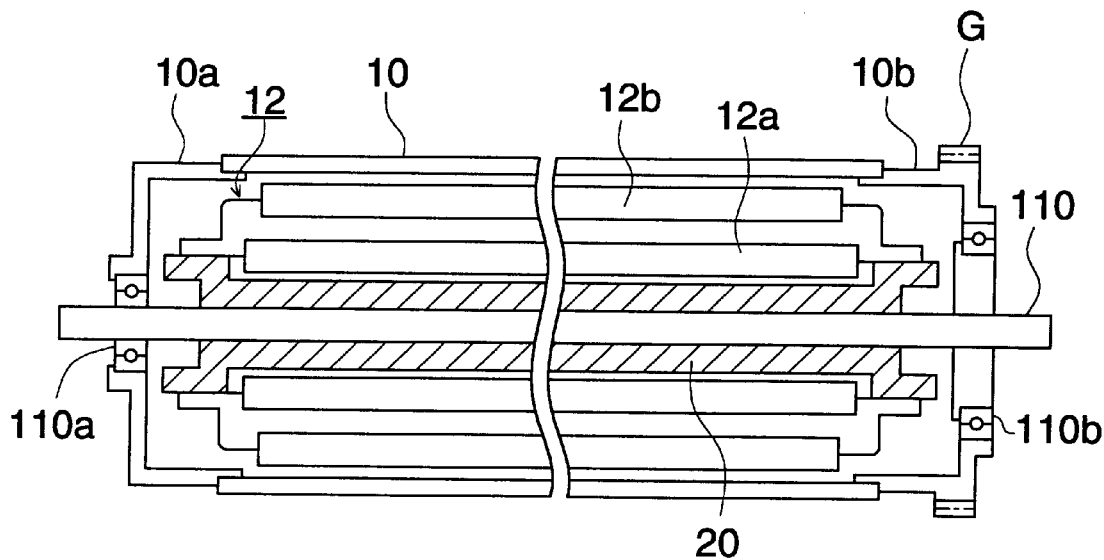
FIG. 2 is a cross-sectional view of the image forming member through the center axis.

The photoreceptor drum 10, as is shown in the cross-sectional view of FIG. 2, is rotated at a constant speed in the predetermined direction, by driving the flange member 10b fixedly joined at the side end of the drum with the gear G unitarily integrally formed on the flange member 10b meshed with the driving gear of the apparatus mainframe, with the flange member 10b, together with the flange member 10a fixedly joined to the drum, supported rotatably, borne by the bearings 110a and 10b fitted in said flange members 10a and 10b, around the drum shaft 110 which is mounted fixedly to the apparatus mainframe.

The scorotron charger 11, the charging means, is used in the image forming processes for each of colors, yellow (Y), magenta (M), cyan (C), and black (B), fitted in such a manner as to face the photoreceptor drum 10 and extends in the direction perpendicular to the movement of the photoreceptor drum 10, the image forming member; the scorotron charger 11 having a control grid kept at a predetermined electric potential and a discharging electrode 11a made up of, for example, a saw-tooth-shaped electrode, carries out charging process to the aforesaid organic photoconductor layer of the photoreceptor drum 10 through the corona discharging of the same polarity as the toners (negative charging in this embodiment of the invention), giving a uniform electric potential to the photoreceptor drum 10. As for the discharging electrode 11a, in addition to the above, a wire electrode is also available.

The exposure unit 12, the image exposure means for each color, is placed in a manner such that the exposed portion on the photoreceptor drum 10 is positioned between the discharging electrode 11a of the scorotron charger 11 and the developing position of the developing unit 13.

The exposure unit 12 is composed of the linear exposure elements 12a made up of an array of plural number of LED's (light emitting diodes) as the light emitting elements for the image exposure and the SELFOC lens 12b as the equi-sized image focusing element, both mounted to a holder not shown in the drawing. The exposure unit 12 for every color, the uniform exposure unit 12c, and the simultaneous exposure unit for transfer 12d are mounted to the holder member 20 and received inside the substrate of the photoreceptor drum 10. The image data read by the image reading portion A and image-processed by the image processing portion B for every color are inputted into the exposure unit 12 for every color respectively as an electric signal.

For the exposure element, in addition to the above-mentioned one, an array of a plural number of light emitting elements such as FL (fluorescent luminescence) elements, EL (electroluminescence) elements, and PL (plasma luminescence) elements is also employed. The wave length of the emitted light for use in this embodiment of the invention, although the wavelength in the range of 780 nm to 900 nm, where the transmittance of the color toners Y, M, and C is high is usually used in case of exposure from outside, may be the one in the range of 400 nm to 780 nm which is shorter than the above-mentioned and for which the color toners have not a sufficient transmittance, because the method employed is the type in which exposure is made from the reverse side of the photoreceptor.

The developing units 13 for the four colors are disposed around the periphery of the rotating photoreceptor drum 10 in the order of the color image forming, and in this embodiment of the invention, with reference to FIG. 1, the developing units 13 for Y and M are placed at the left side of the photoreceptor drum 10, and the developing units 13 for C and K are placed at the right side of they photoreceptor drum 10. Further, under each of the encasing members 138 of the developing units 13 for Y and M each of the scorotron chargers 11 for Y and M is placed respectively, and above each of the encasing members 138 of the developing units 13 for C and K each of the scorotron chargers for C and K is placed respectively.

Each of the developing units 13, the developing means for each color, receives each of the developers of yellow (Y), magenta (M), cyan (C), and black (K), each having single or two components, and provided with the developing sleeve 131, which rotates in a way such that the direction of moving of the sleeve at the position of developing is the same as that of the photoreceptor drum 10, with a predetermined spacing to the surface of the photoreceptor drum 10 maintained. The developing sleeve 131 is made up of a cylinder made of non-magnetic stainless steel or aluminum material having a thickness of 0.5 mm to 1.0 mm and an outer diameter of 15 mm to 25 mm.

The developing unit 13 is kept in the non-contacting state against the photoreceptor drum 10 with a predetermined spacing, for example, 100 µm to 1000 µm by means of a roller spacer not shown in the drawing. At the time of developing process by the developing unit 13 for each color, a developing bias voltage composed of a direct current voltage or further an alternate current voltage added is applied to the developing sleeve 131, so that the jumping development can be carried out with the developer composed of single or two components received by the developing unit. In this case, the direct current bias voltage having the same polarity (negative polarity in this embodiment of the invention) as the toner charge is applied to the developing sleeve against the negatively charged photoreceptor drum 10, so that the non-contacting reverse development whereby toner particles deposit on the light exposed area can be done. It is necessary that the accuracy of the development gap in this case is within 20 µm in order to prevent uneven developing.

The above-mentioned developing unit 13 for each color develops reversely the latent electrostatic image formed through charging by the aforesaid scorotron charger 11 and the imagewise exposure by the exposure unit 12 using the non-contacting developing method with applied developing bias voltage with the toner having the charge of the same polarity as the latent image (In this embodiment, the photoreceptor is negatively charged, hence the toner charge is also negative.) in the non-contacting state.

When image recording starts, the drive motor (not shown in the drawing) starts working to rotate the gear G provided on the rear flange 10b of the photoreceptor drum 10 through the driving gear, said gear G rotating the photoreceptor drum 10 clockwise as shown by the arrow mark in FIG. 1. At the same time, the photoreceptor drum 10 starts to be given the electrostatic charge on the left side portion of the photoreceptor drum 10 by the charging action of the scorotron charger 11 for Y placed under the encasing member 138 of the developing unit 13 for yellow (Y).

After electrostatic charge is given to the photoreceptor drum 10, the exposure on the basis of the first color signal, that is, the electric signal corresponding to the image data for Y starts and the latent electrostatic image corresponding to the image of Y in the original image is formed on the surface of the photoreceptor drum 10 with the scanning by its rotation.

The aforesaid latent image is reversely developed by the developing unit 13 for Y, with the developer on the developing sleeve kept in non-contacting state, to form the toner image of yellow (Y) through the rotation of the photoreceptor drum 10.

Next, the photoreceptor drum 10 is further given the electrostatic charge on the aforesaid toner image of yellow (Y) by the charging action of the scorotron charger 11 for magenta (M) placed to the left side and above the developing unit 13 for yellow (Y) and under the encasing member 138 of the developing unit 13 for magenta (M); the exposure is carried out on the basis of the second color signal, that is, the electric signal corresponding to the image data for M, and the toner image of magenta (M) is formed, superposed on the aforesaid toner image of yellow (Y), through the non-contacting reverse development by the developing unit 13 for M.

Through similar process, in the right side of the photoreceptor drum 10, the toner image of cyan (C) corresponding to the third color signal is further formed by the scorotron charger 11 for cyan (C) placed above the encasing member 138 of the developing unit 13 for cyan (C), the exposure unit 12 for C, and the developing unit 13 for C, and successively the toner image of black (K) corresponding to the fourth color signal is formed by the scorotron charger 11 for black (K) placed above the encasing member 138 of the developing unit 13 for black (K), the exposure unit 12 for K, and the developing unit 13 for C, with both images superposed on the previous images. Thus, the full color images are formed on the circumferential surface of the photoreceptor drum 10 within one rotation of the drum (the toner image forming means).

The exposure process for the organic photoconductor layer on the photoreceptor drum 10 by these exposure units 12 for Y, M, C, and K is made from the inside of the drum through the aforesaid transparent substrate member. Accordingly, any one of the exposure processes for the images corresponding to the second, the third, and the fourth color signals can be carried out, not affected at all by the toner images formed previously, and it is possible to form latent electrostatic images equivalent to the image corresponding to the first color signal.

Through the above-mentioned image forming process, the superposed color toner images which are supposed to be the reverse side images are formed on the photoreceptor drum 10 (image forming member), and in the transfer station 14b, the toner images are transferred altogether at the same time onto the toner image receiving member 14a (the intermediate transfer member), the second image bearing means, which is entrained around the drive roller 14d and the follower roller 14e and provided in the vicinity of or in contact with the photoreceptor drum 10, by beans of the transfer unit 14c (the first transfer means) to which a direct current voltage of the reverse polarity (positive in this embodiment) to the toner charge is applied. On this occasion, a uniform exposure by the simultaneous exposure unit for transfer 12d employing, for example, an LED (light emitting diode) is made so that good transfer may be done.

The residual toner particles on the circumferential surface of the photoreceptor drum 10 after the transfer process are subjected to the charge eliminating process by the AC discharging unit 16 for the image forming member, and then come to the cleaning device 19, where they are removed by the cleaning blade made of rubber contacting the surface of the photoreceptor drum 10. Further, in order to get rid of the history of the photoreceptor up to the preceding print, the charge on the photoreceptor surface given in the preceding print process is eliminated through the exposure before charging by the uniform exposure unit 12c employing, for instance, an LED (light emitting diode), and successively the next color image forming process for the front side images is carried out.

Figure 3:
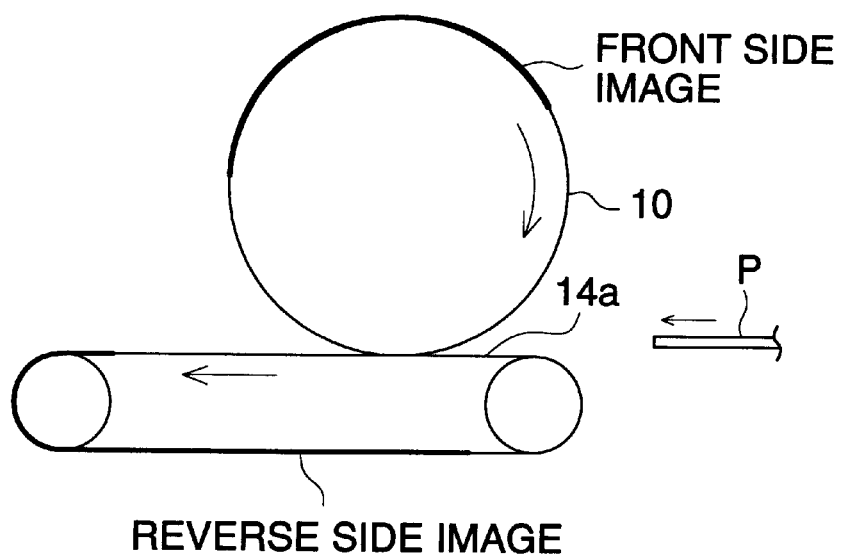
FIG. 3 is an illustration showing the positional relationship of the toner images for double-sided copying.

After the superposed color toner images which are supposed to be the reverse side images are formed on the toner image receiving member 14a, successively on the photoreceptor drum 10 the superposed color toner images which are supposed to be the front side images are formed in the same manner as the above-mentioned color image forming process. In this case, the toner image formation on the photoreceptor drum 10 is made in the timing such that the formed toner images on the drum 10 and the toner images on the toner receiving member 14a should overlap to be registered each other in the transfer area 14b, as shown in FIG. 3. Further, in order that the front side images formed in this process and the reverse side images formed in the preceding process may be in the relationship of the mirror images to each other on the photoreceptor drum 10, the image data are corrected in the image processing portion B to be explained later.

A sheet of recording paper P of the size corresponding to the instruction for the recording paper size from the pertinent one out of the paper feeding cassettes 15A, 15B, and 15C by each of which each size of paper sheets are received is conveyed out by the take out roller 15a and transported by the feeding roller 15b to the timing roller 15c.

The sheet of recording paper P is fed to the transfer station 14b by the driving of the timing roller 15c, in synchronism with both the color toner images for the front side carried by the photoreceptor drum 10 and those for the reverse side carried by the toner image receiving member 14a. On this occasion, the sheet of recording paper P is charged by the paper charging unit 14f, the means for charging the transfer member, in the same polarity as the toner charge, attracted to the toner receiving member 14a, and is fed to the transfer station 14b. By charging in the same polarity as the toner charge, it is prevented that the sheet of recording paper P attracts the toner particles in the portion other than the transfer station from the toner images on the toner image receiving member 14a or from those on the photoreceptor drum 10, hence the toner images are prevented from being disturbed. Further, as for the means for charging the transfer member, a conductive roller capable of contacting the toner image receiving member 14a and being released from contacting, a brush charging unit, or other appropriate device can be employed.

The images for the front side on the circumferential surface of the photoreceptor drum 10 are transferred altogether at the same time by the transfer unit 14c as the first transfer means, to which a voltage with a reverse polarity (positive polarity in this embodiment) to the toner charge is applied, onto the upper side (the front side) of the sheet of recording paper P. On this occasion, the images for the reverse side on the circumferential surface of the toner image receiving member 14a are not transferred onto the sheet of recording paper P, remaining present on the receiving member 14a. Next, the images for the reverse side on the circumferential surface of the toner image receiving member 14a are transferred altogether at the same time by the transfer unit for the reverse side 14g as the second transfer means, to which a voltage with a reverse polarity (positive polarity in this embodiment) to the toner charge is applied, onto the lower side (the reverse side) of the sheet of recording paper P. At the time of transfer by the transfer unit 14c, a uniform exposure is made by the simultaneous exposure unit 12d for transfer employing, for example, an LED (light emitting diode) provided inside the photoreceptor drum 10 so as to make good transfer.

Because all the color toner images are superposed one another, in order to enable the all-at-a-time transfer of them, it is favorable that both of the toner particles in the upper layer and in the lower layer have charges of almost the same amount and the same polarity. For this reason, it is not favorable the double-sided image forming process such that the charge polarity of the color toner images formed on the toner image receiving member 14a is reversed by corona charging, or the charge polarity of the color toner images formed on the photoreceptor drum 10 is reversed by corona charging, because of its poor transfer performance due to the insufficient charging to the same polarity for the toner particles in the lower layer.

It is favorable because of its contribution to the improvement in the transfer performance in the formation of the images for the reverse side, that the superposed color toner images having the same charge polarity formed by repeating the reverse development on the photoreceptor drum 10 are transferred all at a time onto the toner receiving member 14a without changing the polarity, and next the images are transferred all at a time onto the sheet of recording paper P. Also for the formation of the front side images, it is favorable because of its contribution to the improvement in the transfer performance in the formation of the images for the front side, that the superposed color toner images having the same charge polarity formed by repeating the reverse development on the photoreceptor drum 10 are transferred all at a time onto the sheet of recording paper P without changing the polarity.

For the reasons stated above, it is favorably adopted in the formation of the color images, the method of double-sided image recording such that the color toner images are first formed on the front side of the transfer member by the action of the first transfer means, and next the color toner images are formed on the reverse side of the transfer member by the action of the second transfer means, using the above-mentioned image forming method for the front side and for the reverse side.

The toner image receiving member 14a is composed of two layers: the semiconductive substrate member which is an endless rubber belt with a thickness of 0.5 mm to 2.0 mm made of silicone rubber or polyurethane rubber having a resistivity of $10^8$ to $10^{14}$ Ωcm, and the overcoating layer on the outer surface of the substrate member made of a fluoro-resin with a thickness of 5 μm to 50 μm as a toner filming preventing layer. Instead of the rubber belt substrate, a belt made of a polyester resin, a polyethylene resin, a polyethylene terephthalate, a polyimide resin, and so forth having a thickness of 0.1 mm to 0.5 mm and semiconductive property can be used.

The sheet of recording paper P on both sides of which the color toner images are formed is discharged by the AC discharger for paper pick-off 14h (hereinafter referred to also as pick-off electrode) as the means for picking off the transfer member, picked off from the toner image receiving member 14a, and transported to the fixing apparatus 17, the fixing means, composed of two rollers both having a heater inside. By the application of heat and pressure between the fixing roller 17a and the pressing roller 17b, the toner particles adhering on the front and reverse sides of the sheet of recording paper P are fixed, and the sheet of recording paper P, with the images recorded on both sides of it, is transported and ejected by the ejecting roller 18 to the tray outside the apparatus.

The residual toner particles on the circumferential surface of the toner image receiving member 14a after the transfer process, are removed by a blade capable of contacting the toner image receiving member 14a and being released from it provided in the cleaning device 14i for the toner image receiving member, the means for cleaning the toner image receiving member. Further, the residual toner particles on the circumferential surface of the photoreceptor drum 10 after the transfer process are subjected to the charge eliminating process by the AC discharging unit 16 for the image forming member, and then come to the cleaning device 19, where they are scraped off into it by the cleaning blade made of rubber contacting the surface of the photoreceptor drum 10, and the photoreceptor drum 10 is ready for the next image forming.

Now, with reference to the block diagram in FIG. 4, the circuit structure of the above-mentioned color image forming apparatus composed of the aforesaid image reading portion A, image processing portion B, and image forming portion C will be explained.

First, in the image reading portion A, the color-separated analogue signals for the three colors outputted from the aforesaid image sensor CCD's are converted into the digital image signals (image data) by the A/D converter B11, and outputted to the image processing portion B through the interface B12.

The digital image signals (brightness information) inputted into the image processing portion B are first converted into density information by the brightness/density conversion portion B13.

Further, re-size processing in accordance with the re-size instruction by the user is made in the enlarging-reduction processing portion B14. On the other hand, in the image discrimination processing portion B15, the discrimination regarding whether the image is a letter image or a photograph image is executed on the basis of the density information converted in the aforesaid brightness/density conversion portion B13, and on the basis of the result of said discrimination, the filter characteristics in the filter processing portion B 16 are determined, further in the filter processing portion B16, the space filter processing is made in accordance with said determined characteristics.

In addition, the aforesaid image discrimination processing portion B15 is equivalent to the image discriminating means and processing characteristics varying means in this embodiment, and the discrimination of the letter image and the photograph image includes that of the letter image area and the photograph image area in the images wherein letter images and photograph images are mixedly present.

In the mean time, in order to carry out the filter processing and the re-size processing with each replaced by the other, a pair of data selectors B17 and B18 are provided. The above-mentioned replacing of the filter processing and the re-size processing is made for preventing the moir which is observed in the images in case of reduction processing.

On the other hand, in the EE processing portion B19, for the purpose of grasping the feature of the original image, the histogram data are obtained on the basis of the image information given by the pre-scanning preceding the proper scanning of the original image. Thus, the CPU in the image processing system (not shown in the drawing) provides an appropriate data for γ correction to the γ correction processing portion B20.

The image data (density information) having been subjected to the filter processing and the re-size processing are then subjected to the γ correction processing in the aforesaid γ correction processing portion B20 in accordance with the characteristics of the image forming apparatus B25 to be described later, and are outputted to the image area processing portion B21. In said image area processing portion B21, in addition to the extraction of the effective image area of the original, the area processings such as the frame elimination and the fold elimination are carried out.

In the above-mentioned manner, the image data (density information) which are subjected to all the image processings that are required for the image forming and made to be in the state of final output to the image forming apparatus B25 to be described later are outputted to the image forming portion C through the interface B22.

The image forming portion C has not only the function to carry out the image forming on the sheets of recording paper in real time with the reading of the original, but also has the image memory portion B23 for memorizing the inputted image data, the data selector B91 which read out said memorized image data optionally later, the image correction processing portion B92 which execute image correction corresponding to the front/reverse side, and the function to make the apparatus to carry out image forming on the basis of the corrected image data.

Now, in this embodiment of the invention, the function, as mentioned above, which stores the image data obtained by reading the original image and subjected to all the image processings required and reads out said stored image data optionally later to make the apparatus carry out the image forming is referred to as the electronic RDH function.

In the image forming portion C, there are provided not only the image forming apparatus B25 such as an LED printer, but also, in order to actualize the aforesaid electronic RDH function, the image memory portion B23 (image data memory means) for memorizing the image data rewritably, the data selector B91 for switching the usual real-time image forming function to said electronic RDH function and also reverse way and portioning out the image data to the front side and the reverse side, and the image correction processing portion B92 for making the image correction corresponding to the front/reverse side.

The aforesaid data selector B91 outputs either the image data read out from the image memory portion B23 or the image data outputted successively from the image processing portion B following the reading of the original selectively to the image forming apparatus B25 (an LED printer).

In other words, in the aforesaid image memory means B23, the image data in the same state of final output as in the case where the real-time processing is made in usual manner are memorized, accordingly, the image data from the image processing portion B and the image data read out from the image memory portion B23, both outputted selectively by the aforesaid data selector B91, are accepted as equivalents in the image forming apparatus B25 to carry out the image forming.

Figure 5:
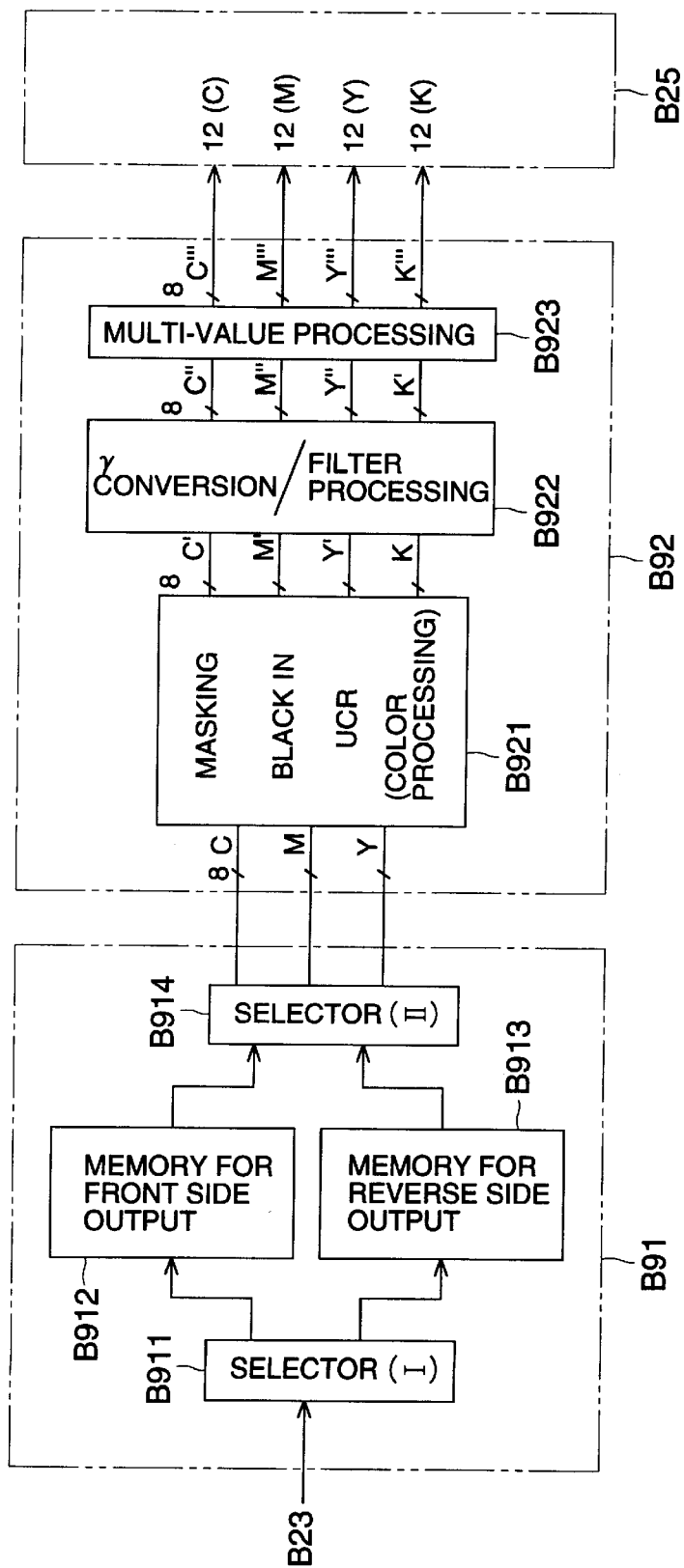
FIG. 5 is a block diagram showing the circuit structure of the data selector and the image correction processing.

FIG. 5 is a block diagram showing the data selector B91 and the image correction processing portion B92 in detail. In the data selector B91, there are provided the memory for outputting the front side data B912 and the memory for outputting the reverse side data B913; when the double-sided image forming mode is selected and the instruction to output the image data is given by the control portion (not shown in the drawing) to the selector (I) B911, where the image data outputted from the image memory portion B23 are first inputted in the memory for outputting the front side data B912 (the first page data), next inputted in the memory for outputting the reverse side data B913 (the second page data). On the occasion of being inputted in the memory for outputting the reverse side data B913, the image data are inputted in such a manner as to be inverted to become the mirror image data.

In synchronism with the timing of the image formation in the image forming apparatus B25, first, the image data for the reverse side are outputted from the memory for outputting the reverse side data B913 to the image correction processing portion B92, and next, the image data for the front side are outputted from the memory for outputting the front side data B912 to the image correction processing portion B92 by the selector (は). In the image correction processing portion B92, the image correction is done for each of the front side and the reverse side image under different conditions to each other. In the following, the image correction processing portion B92 will be explained.

Figure 6:
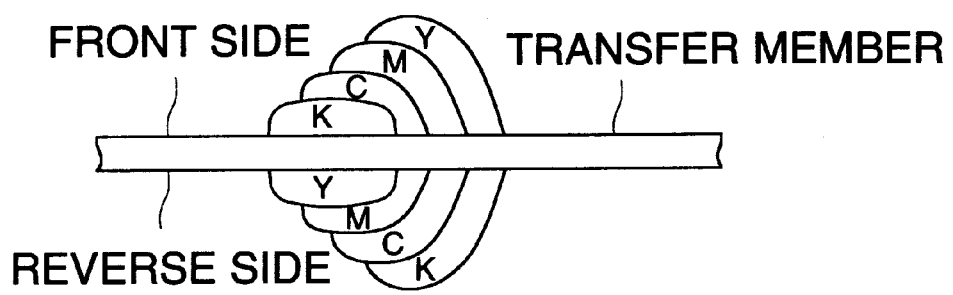
FIG. 6 is an illustration showing the color toner layers adhering to the transfer member.

In the image forming apparatus of this invention, the reverse side images are subjected to two transfer processes: that is, the transfer from the image bearing member to the toner image receiving member and the transfer from the latter to the sheet of recording paper. On the other hand, the front side images are subjected to only one transfer process, that is, the transfer from the image bearing member to the sheet of recording paper. Because by each transfer process the amount of deposited toner particles is reduced by about 10%, the image density of the reverse side becomes lower than the front side if the image processing is made under the same conditions. Further, the gradation of the image is varied much more for the reverse side images due to the scattering of toner particles through two times of transfer. In case of dot screen images, the dots spread out and it appears the tendency that $\gamma$ becomes higher. Furthermore, in the color images, the tone of color is varied for the reverse side because the order of superposing of toner images is reversed on the recording paper sheet as shown in FIG. 6. The quantity of UCR is obtained from the mixing ratio of the three colors Y, M, and C, and the K layer comes to the uppermost in the reverse side images, which makes the tendency to emphasize K too much, hence it is necessary that the quantity of UCR is changed for the reverse side images against the front side for the better color reproduction.

In this invention, in the color processing portion, the masking portion makes color processings such as masking, inking (black addition), and UCR. As for masking, linear masking as is generally employed, or in the case where a high-degree color correction is made, non-linear masking or masking using a look-up table is employed. The masking parameters for the color correction are predetermined for each of the front side image and the reverse side image and in response to the instruction for the front or reverse, the switching to the appropriate set is practiced. After the color processing B921 like this, the $\gamma$ conversion, and the filter processing B922 are made, and through the multi-valued digitizing processing B923 such as screen angle, dither, and error diffusion, the data output to the exposure unit 12 of each of colors Y, M, C, and K is carried out. Owing to the image correction processing as mentioned above, the double-sided image forming with correct image density and color tone is achieved. Because the reverse side image is subjected to the two transfer processes, the $\gamma$ is easy to become high and the resolution is easy to be lowered. However, the above-mentioned processings have a function to correct these.

Incidentally, in the case of a monochromatic image, there is no need for color correction, of course, and it is necessary only to make the $\gamma$ correction, the filter processing, and the density correction for the reverse side image. If the maximum density of black is equal to the saturation density, the double-sided images with no discernible difference between the front and reverse side images can be obtained by changing the parameters only for the $\gamma$ correction and the filter processing.

Further, in the above explanation, the mirror-image conversion processing of the image data is made to be practiced in the data selector B91, however, it is possible that the circuit structure such that the mirror-image conversion processing is included in the parameters which are switched in accordance with the front/reverse side instruction in the image correction processing portion B92.

In the following, with reference to FIG. 7, the detailed structure of the aforesaid image memory portion B23 will be explained.

Figure 7:
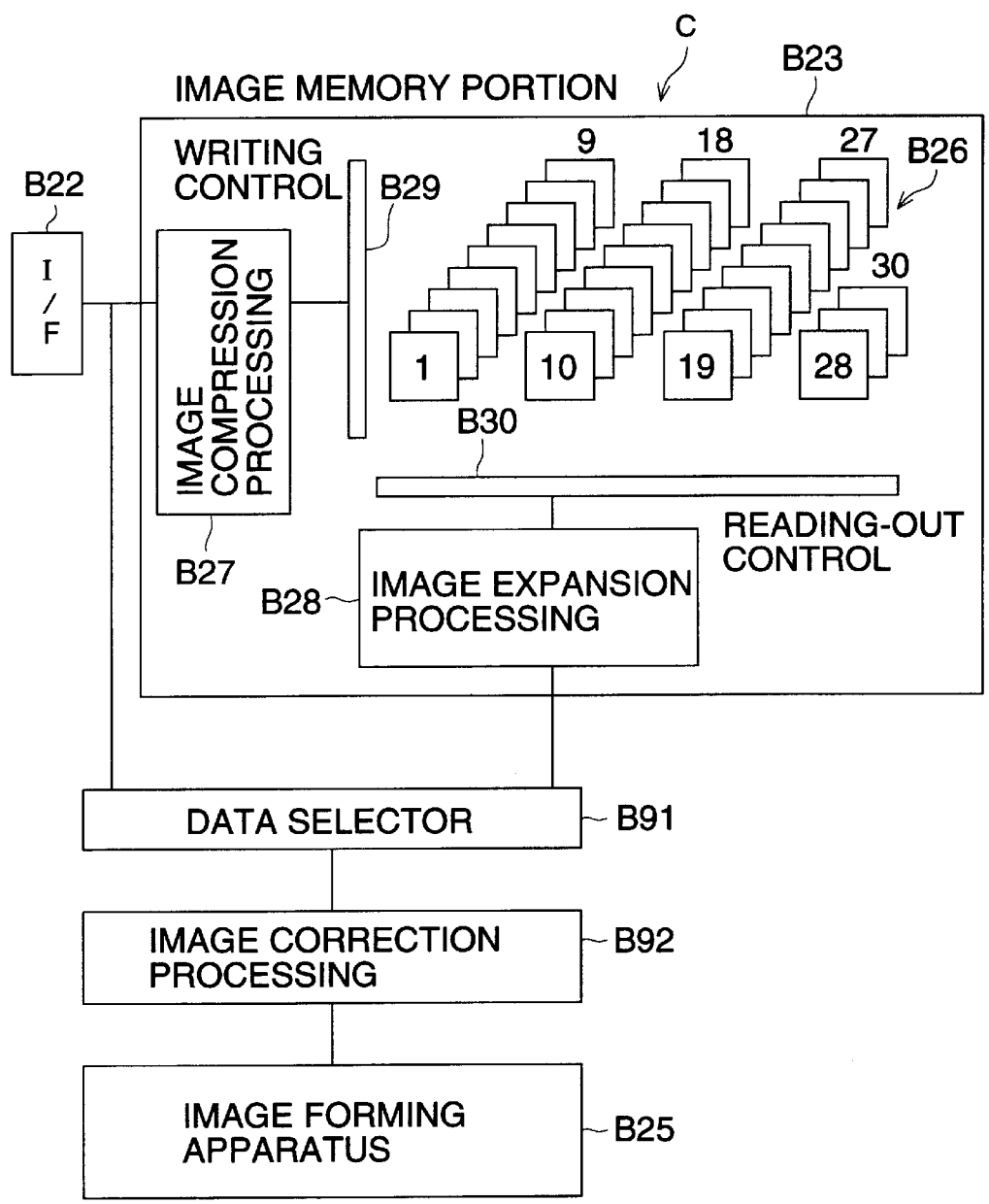
FIG. 7 is a block diagram showing the image recording portion in the first example of practice.

As is shown in FIG. 7, in the image memory means B23 there are provided not only the memory circuit B26 (image data memory means) for actually memorizing the image data, but also the compression processing portion B27 (compression processing means) for making the compression processing for the image data having been subjected to the image processing in the image processing portion B and making the data to be memorized in said memory circuit B26, the expansion processing portion B28 (expansion processing means) for making the expansion processing for the image data read out from the memory circuit B26 and restoring the data to the image data in the state of output from the image processing portion B, the writing control circuit B29 for controlling the writing (memorizing) of the image data in the memory circuit B26, and the reading control circuit B30 for controlling the reading-out of the image data from the memory circuit B26.

From the aforesaid image processing portion B, only the processed image data are outputted, and in the aforesaid compression processing portion B27, the image data are subjected to the compression processing employing a definite method of compression, and only the compression-processed data are memorized in said memory circuit B26. Further, the image data read out from the memory circuit B26 are subjected to the expansion processing, which is established corresponding to said compression processing in said compression processing portion B27, in the expansion processing portion B28 to be restored to the image data in the state of output from the image processing portion B.

Further, the aforesaid memory circuit B26 shown in FIG. 7 is made up of divisions in page unit in a manner such that the image data are memorized with a unit of A4 size, and has a capacity capable of memorizing 30 sheets of double-sided A4 original. In addition, from this memory circuit the data can be read out in the changed order, and the image data for any optionally selected pages can also be seriatim read out, further, for example, it is also possible that the front and reverse side image data are seriatim read out or the data for two A4-sized pages are read out and outputted, developed to the data for one A3-sized page.

Figure 9:
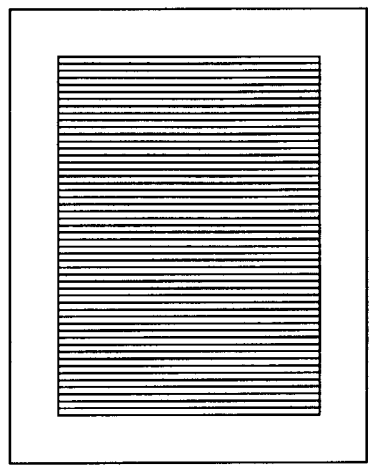
FIGS. 9(a) to 9(c) are drawings showing the divided state into the photograph portion and the letter portion.
Figure 9:
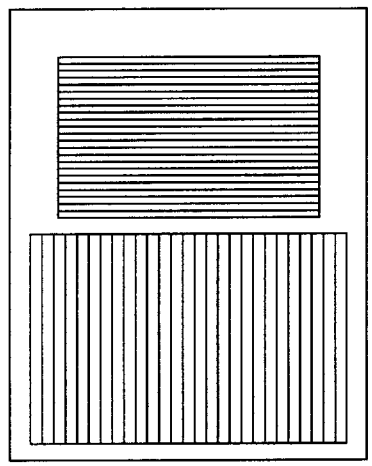
Figure 9:
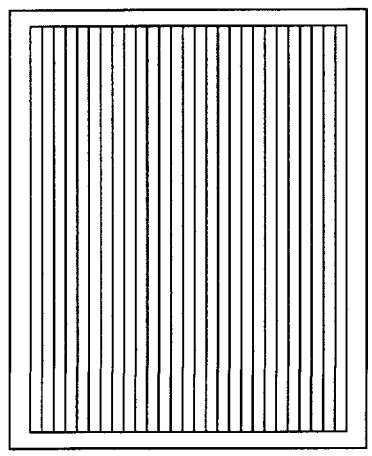

Now, the original images are classified into three kinds, as shown in FIG. 8(*a*), 8(*b*), and 8(*c*), that is, the photograph original (original example A), the original with mixed presence of photographs and letters (original example B), and the letter original (original example C). FIG. 9(*a*), 9(*b*), and 9(*c*) shows the area division into photograph portion and letter portion for the above-mentioned original images, and it is desirable to establish the different image processing characteristics appropriate for each area according to such classification. Accordingly, in this example of practice of the invention, in the image discrimination processing portion B15 the discrimination to letter image and photograph image is practiced to vary the characteristics of the filter processing.

On the other hand, in this example of practice of the invention, the circuit structure is made up in a manner such that the image data for which all the image processings including the image processing in which the characteristics are to be varied in response to the result of the discrimination are finished, in other words, the image data, having been subjected to the image correction processing for front/reverse side by the data selector B91 and the image correction processing portion B92, capable of being outputted directly to the image forming apparatus B25 are memorized in the aforesaid image memory portion B23.

Therefore, according to this example of practice of the invention, when the image data are memorized in the image memory portion B23, it is not necessary that the information about the front/reverse side, the information about the image discrimination (classification information), the data indicating the necessary processing to be made, and so forth are memorized together with the image data; only the image data should be memorized. For this reason, although the circuit has a structure such that the aforesaid original of a lot of kinds and varieties as shown in FIG. 8(a), 8(b), and 8(c) can be read, it does not require to be provided with any special memory circuit, so that it may have a simple structure, and the memory capacity can be used only for memorizing the image data so that it may memorize a lot of images in a limited memory capacity. Besides, it can easily cope with the change of output mode for front/reverse side.

Further, owing to the preceding image processing in accordance with the result of the image discrimination, a definite compression processing with an appropriate compression rate can be applied to all the image area, and in such a compression processing there is no need for making the processing such as adding the image discrimination information and memorizing the image data according to the division by the image discrimination; it may be admitted that only the image data are memorized for every original collectively. Accordingly, the reading-out of the memorized image data and the expansion processing can be carried out with ease and a high speed.

Owing to the function of the electronic RDH making the image memory portion B23 memorize and store the image data, it is not required to carry out the image reading and image processing for every image forming process in case of making plural copies of the same original, serving to make the efficiency of copying operation higher.

In particular, in case of making plural sets of copies from an original consisting of plural pages in a set-by-set manner, it is necessary only to read the original having plural pages once by automatically transporting the original by an ADF (automatic document feeder), hence the recirculating operation for the original can be omitted, which enables the apparatus to carry out the operation with a high speed.

Further, it is possible that the image data remain stored even after the expected image forming process is finished, hence the copying operation without the original document at hand becomes possible by storing the image data for a long period. In this case, a memory device such as an photomagnetic disc employed for the memory circuit makes it possible to store the image data in a disc capable of mounting and demounting so that plural originals can be copied optionally at any time when required. Moreover, in accordance with the output mode of the required original, the appropriate image data correction is made by the image correction processing portion B92 to print out the images.

In addition, in the above-mentioned example of practice of the invention, the image memory portion B23 is provided in the image forming portion C, however, it may be appropriate that the image memory portion B23 is provided in the image processing portion B, and the image processor system consisting of the image reading portion A and the image processing portion B and the image forming portion C are provided in a separate manner.

Further, the image processing is not limited to the above-mentioned filter processing, enlargement-reduction processing, and γ correction.

Still further, in the case where the image forming is made in real time on the basis of the image data read by the photoelectric conversion, the structure such that the image data are once memorized in the image memory portion B may also be employed.

Besides, if the image data read out from the image memory portion B23 are made to be displayed on the operation panel of the copying machine in a simple manner for the confirmation of the image data memorized in the image memory portion B23, confirmation of the images which are stored for a long time and the erasing operation of the memorized data can be easily done; that is favorable.

In the meantime, it is known the technology by which the compression rate is automatically set variably in accordance with the kind of the image in the compression processing of the image data, however, in some cases users prefer a high image quality to a high compression rate, and in some other cases they prefer a higher compression rate for increasing the number of images to be memorized.

Then, taking the case of the color image forming apparatus explained in the above-mentioned first example of practice for instance, it will be explained in the following the second example of practice of the invention in which the rate of compression in the compression processing is made to be specified optionally in the structure such that, as is mentioned above, the image data read by the photoelectric conversion are subjected to the compression processing after the image processings and memorized in the aforesaid memory circuit B26 (image data memory means).

Figure 4:
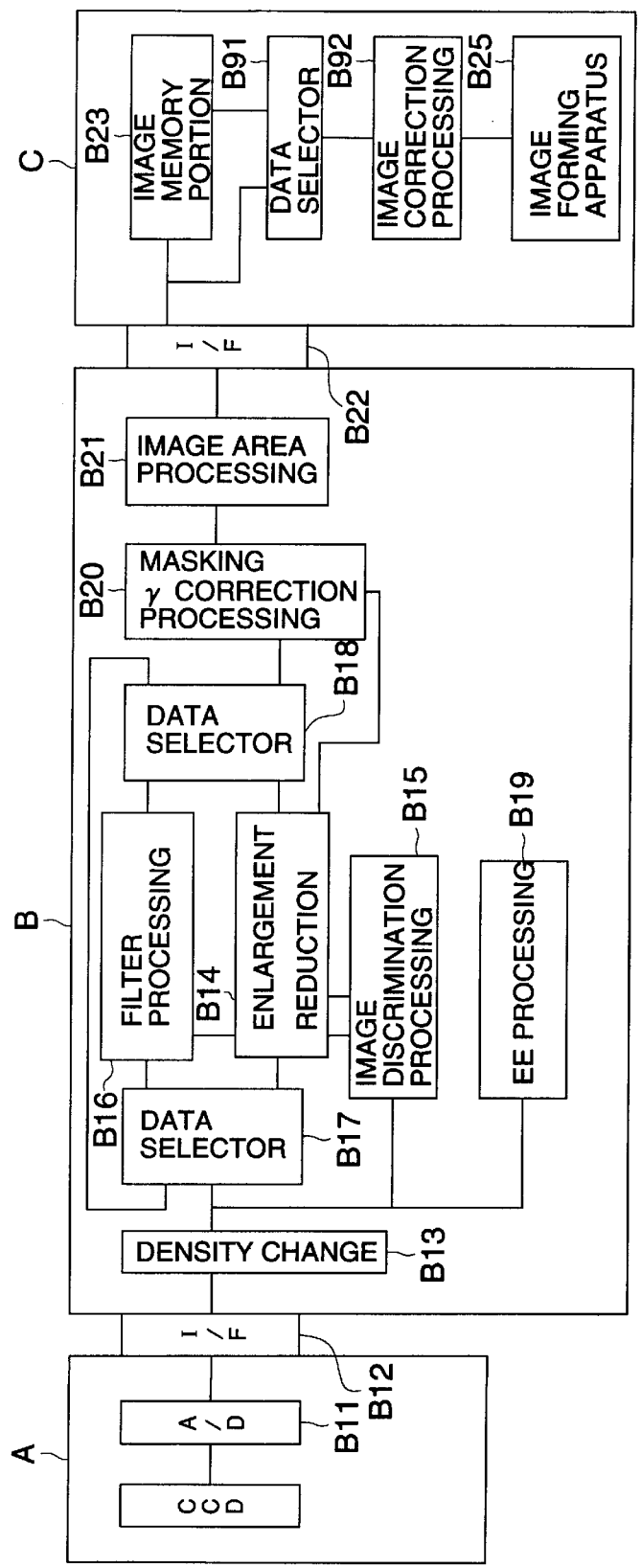
FIG. 4 is a block diagram showing the circuit structure in the first example of practice.
Figure 10:
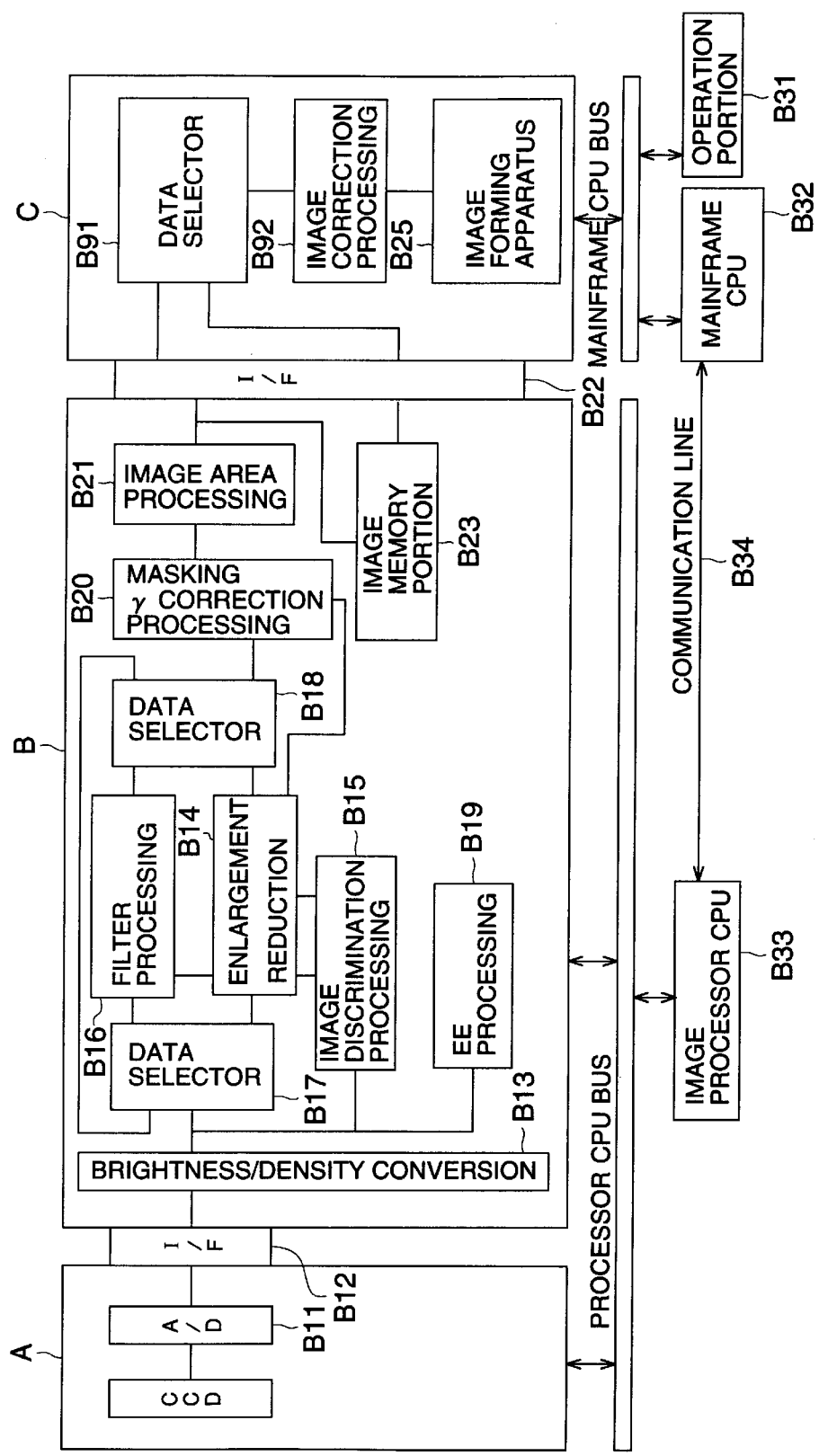
FIG. 10 is a block diagram showing the circuit structure in the second example of practice.
Figure 11:
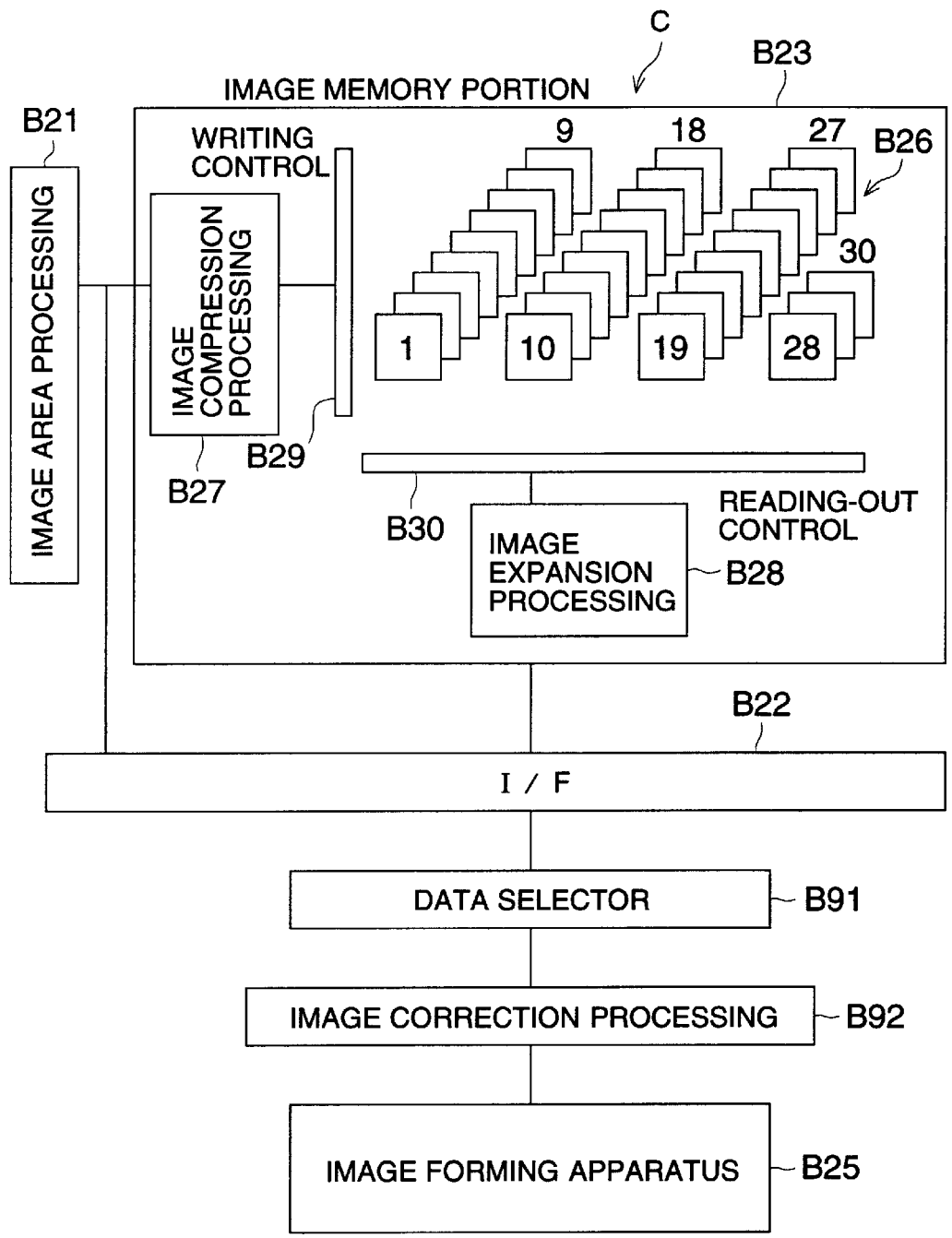
FIG. 11 is a block diagram showing the image memory portion in the second example of practice.

In the block diagram of FIG. 10 and FIG. 11 showing the structure of the second example of practice, the detailed explanation will be omitted for the same elements as those in FIG. 4 and in FIG. 7 by putting the same signs on them.

In the above-mentioned block diagram of FIG. 10 and FIG. 11, the structure characteristic of the second example of practice is the one such that the image memory portion B23 (image data memory means) is provided in the image processing portion B so that either the image data memorized in the image memory portion B23 or the real-time image data obtained by reading may be selectively outputted to the image forming portion C.

That is, the image data processed in the image area processing portion B21 are directly outputted to and memorized in the image memory member B23, and to the image forming portion C, either the image data processed in the image area processing portion B21 or the image data selectively read out from the image memory means B23 are outputted through the interface B22 and further through the data selector B91 and the image correction processing portion B92.

The data selector B91 selects either the real-time image data obtained by reading, inputted through the aforesaid interface B22, or the image data selectively read out from the image memory portion B23, and outputs the selected data to the image forming apparatus B25 through the image correction processing portion B92.

Further, as is shown in the whole structure of FIG. 10, the control circuit for the image processor system consisting of the image reading portion A and the image processing portion B and the control circuit for the image forming portion C each are independently provided, and further the operation portion B31 is provided in an attached manner in the side of the image forming portion C.

In the above-mentioned operation portion B31 there is provided an operation function for specifying the compression rate in the compression processing of the image data as will be explained later, and the compression rate specified through this operation portion as the means for specifying compression rate is transmitted, through the mainframe CPU B32 for controlling the system related to the image forming portion C, to the image processor system CPU B33 for controlling the image processor system consisting of the image reading portion A and the image processing portion B further through the communication line B34.

The image processor system CPU B33 as a means for varying the compression rate sets the compression rate in the compression processing portion B27 (refer to FIG. 11) comprised in the aforesaid image memory means B23 as the compression processing means, in accordance with the compression-rate-specifying data from the mainframe CPU B32 transmitted through the aforesaid communication line B34.

Then the compression processing in accordance with the specified compression rate is carried out in the compression processing portion B27, and the image data after this compression processing are memorized in the memory circuit B26. The image data read out from the memory circuit B26, after subjected to the expansion processing corresponding to said compression processing in the expansion processing portion B28 (expansion processing means) to be restored, are outputted to the image forming apparatus B25 (image forming means) through the image correction processing portion B92.

Now, an example of the aforesaid operation portion B31 will be explained with reference to FIG. 12.

Figure 12:
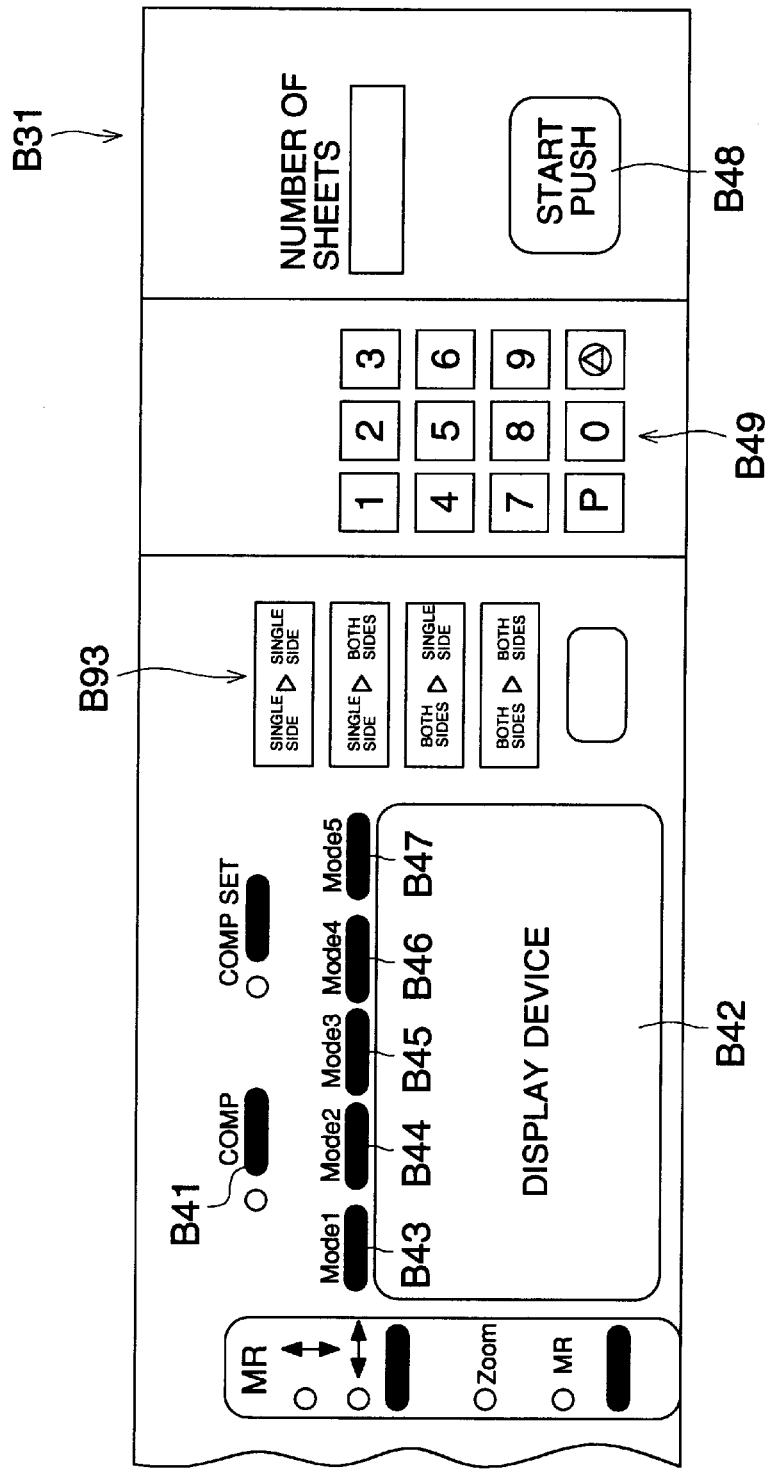
FIG. 12 is a drawing showing an example of the operation portion in a copying machine.

In the operation portion B31 shown in FIG. 12, by pressing the button B41 indicated by the display 'COMP', the five compression modes, Mode 1 to Mode 5, are displayed on the display device B42 composed of a liquid crystal panel or a small-sized CRT as shown in FIG. 13.

In addition, in the above-mentioned state of display shown in FIG. 13, the numerical values of the compression rate corresponding to the five modes, Mode 1 to Mode 5, respectively may appropriately be displayed.

Among the aforesaid five compression modes, Mode 1 to Mode 5, the Mode 3 is the standard compression rate mode for specifying the standard compression rate, and the Modes 1 and 2 are the image-quality-preferred modes for giving priority to image quality by reducing the rate to lower values than the standard; the setting is made in a manner such that the compression rate in Mode 2 is lower than the Mode 3, and that in Mode 1 is lower than the Mode 2. On the other hand, the Modes 4 and 5 are the compression-rate-preferred modes for increasing the number of the images to be memorized by making the compression rate higher than the standard; the setting is made in a manner such that the compression rate in Mode 4 is higher than the standard, and that in the Mode 5 is higher than the Mode 4.

Any one of the above-mentioned compression modes, Mode 1 to Mode 5, is selected by operating the corresponding switch among the five mode switches, B43 to B47 provided at the upper portion in the display device B42, and fixed by operating the 'Start Push' button B48, the trigger button for the image forming operation.

Further, in the case where the user does not particularly specify any one of the above-mentioned compression modes, Mode 1 to Mode 5, the standard mode, the Mode 3, is given priority in the specification to set the mode. Accordingly, in the case where a user who will not require the optional setting for compression rate puts the function of the electronic RDH to practice, the compression processing with the standard compression rate is automatically executed, which makes the operation simple.

Besides, the predetermined compression rate data for each of the modes, Mode 1 to Mode 5, are made to be optionally varied by the user. First, the user should select the mode in which he wants to vary the compression rate by pressing the corresponding mode switch out of the mode switches B43 to B47, and in this state, he should input the numerical value of the compression rate (%) using the ten-key switch B49 (refer to FIG. 14). The change of the compression rate data is fixed by operating the 'Start Push' button B48.

On this occasion, it is appropriate to display how many pages, when converted to, for example, A4 size, of the original can be memorized if the compression processing is carried out with the compression rate which the user has inputted. Further, it may also be appropriate to specify the number of pages to be memorized instead of inputting the numerical value of the compression rate.

Further, it is favorable that the apparatus does not accept the data input which upsets the order of the modes with regard to the magnitude relationship among the compression rate values.

As is explained in the above second example, in the apparatus which has a function such that the image data are subjected to the compression processing and memorized, by making the compression rate in said compression processing to be specified optionally, the image quality is kept good preventing the image data from being compressed with a higher compression rate than that required in view of the memory capacity in the case where the memory has a sufficient capacity to memorize the necessary data and a high image quality is required. Further, in the case where the memory has possibly insufficient capacity for the images to be memorized but a high image quality is not required, the number of images to be memorized can be optionally increased by making the compression rate higher. Accordingly, by effectively utilizing the memory capacity, the apparatus can meet the requirement, depending on the user, for the high image quality or for the increase of the images to be memorized.

Further, in the case where the requirement of the user can not be satisfied by selecting any one of the mode out of the modes of initially determined compression rate, the compression rate, with which a satisfactory image quality for the user is to be obtained, can be specified by closely adjusting the compression rate by the user, hence the apparatus can cope with a slight difference in the level of the image quality required by the user, and makes the ease of operation regarding the function of the electronic RDH enhance.

Moreover, it may also be appropriate for the apparatus to have a structure such that the numerical value for the compression rate is varied on the basis of a standard value, which is different from the above-mentioned one in which the compression rate is specified out of the plural modes.

In the meantime, in the case where the original images are read by photoelectric conversion and the read image data are memorized as has been explained up to now, it must be an ineffective use of the memory to memorize the image data of the blank spaces in the read images and of the image portion which is supposed to be unnecessary at the time of image forming, that is, the null image area, causing the number of the original pages to be memorized to be decreased.

Then, it will be explained in the following the third example of practice of the invention in which the blank spaces in the read images and the null image areas which are supposed to be unnecessary at the time of image forming are made to be out of the object of memorizing, and only the image data in the effective image area are made to be memorized.

Figure 15:
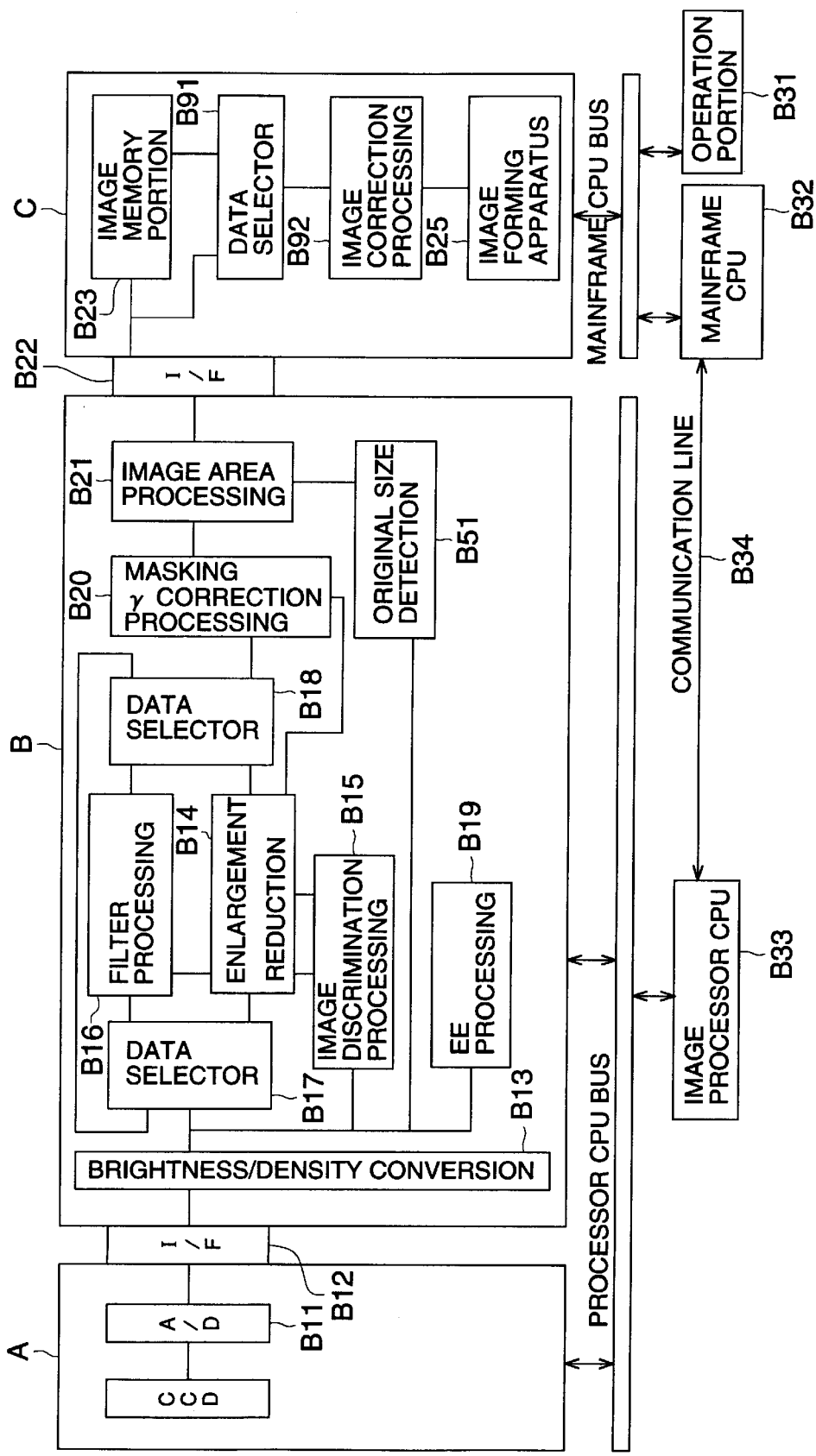
FIG. 15 is a block diagram showing the circuit structure in the third example of practice.

The block diagram in FIG. 15 showing the processing circuit in the third example of practice is different from that shown in FIG. 4 only in that the original size detecting portion B51 as the means for detecting the effective image area is added to this example.

According to this structure of the processing circuit shown in FIG. 15, the original size detecting portion B51 detects the original size (image area size) on the basis of the image data converted into the density, and the information on the detected original size is given to the image area processing portion B21. The image area processing portion B21, the means for extracting the effective area, extracts the image data only in the area corresponding to the original size, in other words in the effective image area, out of the read image data, and outputs the data to the image memory portion B23 (means for memorizing the image data) in the image forming portion C.

Accordingly, for instance in the case where the reading process is made in A3 size but the original size is A4, only the image data in the effective image area of A4 size out of the read image data of A3 size are extracted and outputted to the image memory portion B23, where said extracted image data are compressed and memorized, hence the memory capacity can be saved and it is also possible to improve the image quality by lowering the compression rate.

Figure 16:
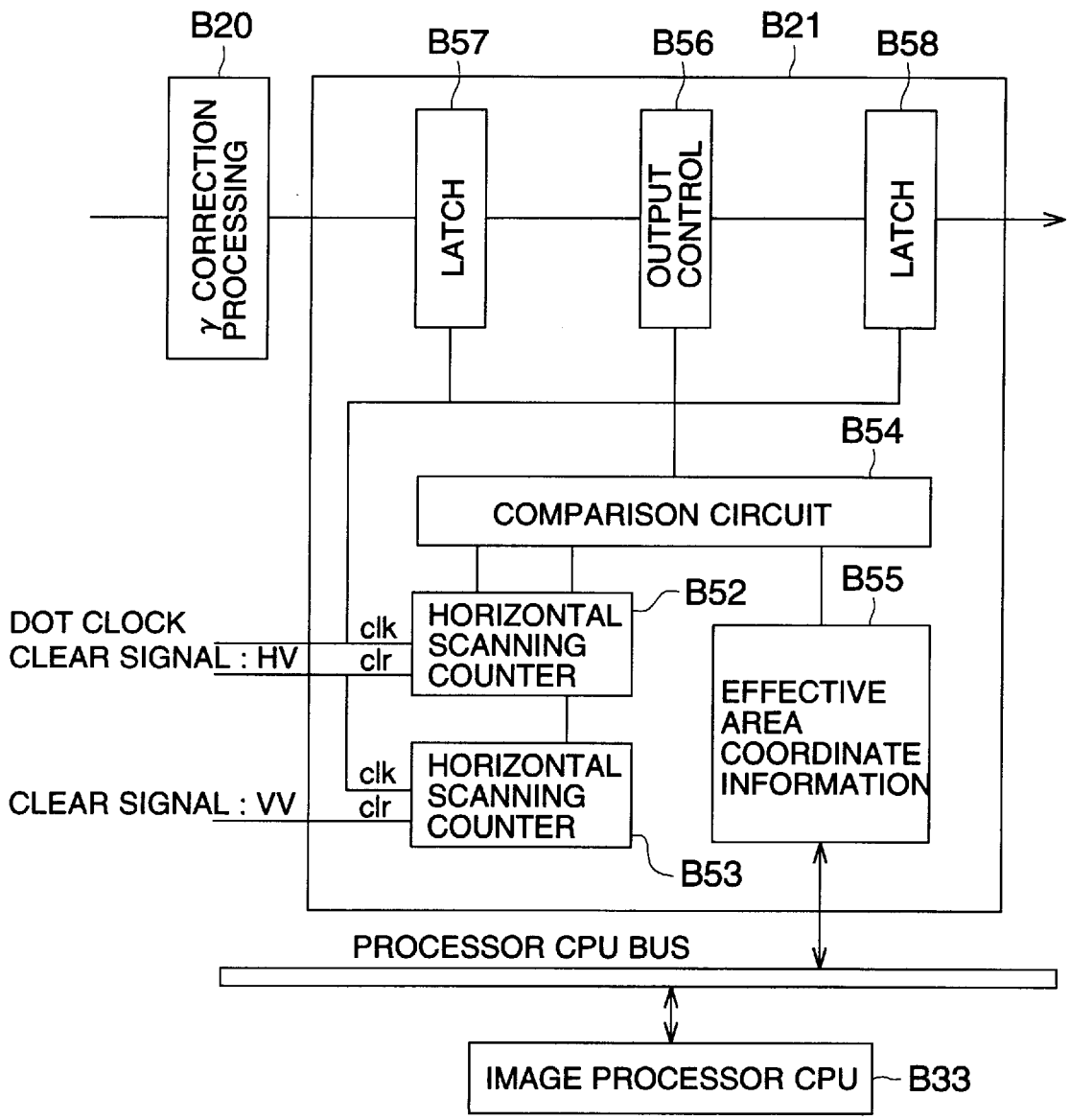
FIG. 16 is a block diagram showing the image area processing portion in the third example of practice.

Now, the process of extracting the image data in the effective image area is made by the aforesaid image area processing portion B21 (means for extracting the effective area), which has, for example, a structure shown in the block diagram of FIG. 16.

In the block diagram of FIG. 16, the horizontal scanning counter B52 counts the dot clock signal clk, with the horizontal synchronizing signal HV made to be a clear signal clr, and the vertical scanning counter B53 counts the dot clock signal clk, with the vertical synchronizing signal W made to be a clear signal clr.

The comparison circuit B54 judges whether the image data are in the effective image area or not, by comparing the coordinate information (defined coordinate data) indicating the effective image area memorized in the memory portion for the effective area coordinate information B55 with the counted numbers by both said counters B52 and B53, and outputs the result of the judging to the output control portion B56.

The output control portion B56 outputs the image data, which are subjected to the γ correction processing in the γ correction processing portion B20 and latched by the latch circuit B57, to the image forming portion C (image memory portion B23) through the latch circuit B58 without further processing if the data belong to the effective area, but if the data do not belong to the effective area (belong to the null image area), it outputs them to the latch circuit B58, with the data fixed to the white or black level.

In the aforesaid memory portion for the effective area coordinate information B55, the coordinate data indicating the effective image area corresponding to the original size detected by the aforesaid original size detecting portion B51 are defined and memorized.

It may be appropriate that the effective image area is determined in accordance with the specified size of recording paper to be used for copying, instead of making the area corresponding to the original size in the read image area to be the effective area. In this case, the information on the size of the recording paper specified in the operation portion B31 is taken in the image processor system CPU B33 through the communication line B34, and the image processor system CPU B33 defines the coordinates of the area to be made as the effective image area on the basis of the size of the recording paper, and sets them in the memory portion for the effective area coordinate information B55.

In other words, although the size of original is, for instance, A3, the image data in the area out of the A4 size are null so long as the size of the recording paper is A4, hence the image data only in the area of A4 size, which are actually to be recorded, are extracted, so that the image data not to be recorded may be prevented from being ineffectively memorized.

In this case, the means for detecting the effective image area is regarded as composed of the aforesaid operation portion B31 and image processor system CPU B33.

It will also do the structure such that the effective image area is to be determined on the basis of both the size of the original and the recording paper, and further it will also be appropriate that the circuit is made up in a manner such that the user can optionally specify the area whose image data the user wants to memorize (effective image area).

In the meantime, if the aforesaid memory circuit B26 is made up in a manner such that it is divided into the units of pages as is shown in FIG. 7, although only the image data in the effective image area are extracted as mentioned above, the efficient utilization of the memory capacity can not be performed.

Figure 17:
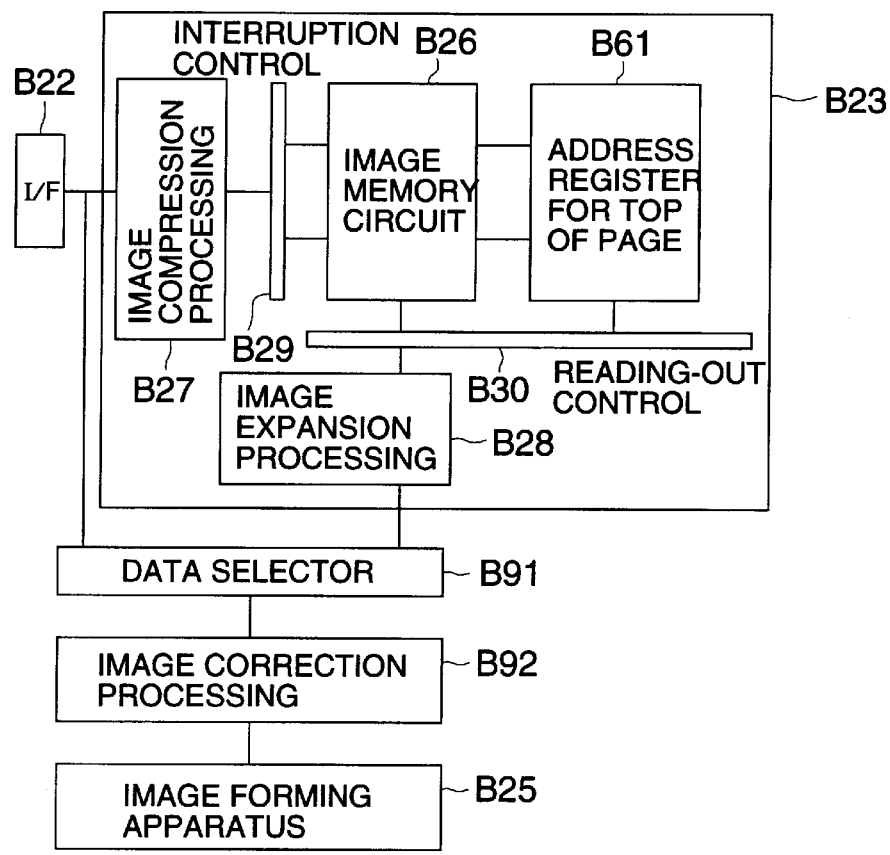
FIG. 17 is a block diagram showing the image memory portion in the fourth example of practice.

Then, as the fourth example of practice which is shown in the block diagram of FIG. 17, in addition to making up the continuous memory circuit B26, it is provided the page-top-address register B61 for memorizing the top address of the memory areas for every image, and on the basis of the top address memorized in said register B61, the memory area corresponding to the desired image is designated to carry out the reading-out of the desired image data.

In other words, when the image data after the compression processing are written in the memory circuit B 26 by the writing control circuit B 29 (memory control means), the address position in which the image data of the first pixel is written is stacked by the register B61. When reading out the data, the reading out control circuit B30 (means for reading out the image) reads out the image data, referring to the aforesaid top address memorized in said register B61.

Figure 18:
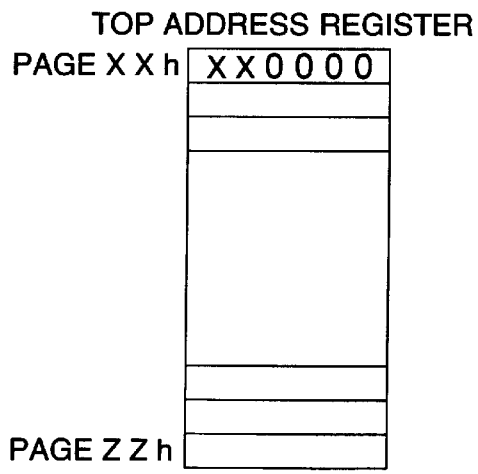
FIG. 18 is a drawing showing the register for memorizing the top address.

In addition, the aforesaid register B61 should be provided only with the number of cells corresponding to the pages calculated depending on the compression rate (refer to FIG. 18).

According to the above-mentioned structure of the memory circuit B26, it is possible to memorize the read image data continuously, hence the memory area not served to memorizing the image data is no more present to enable the efficient utilization of the memory capacity, which realizes necessary and enough image memorizing with a small memory capacity.

Further, it is easily done that the order of reading out the images (pages) can be changed because the top address of each image is memorized in the register B61 as is mentioned above.

Because it is favorable, in the double-sided image forming apparatus according to this invention, that the reverse side images are formed before the front side images, it is adopted the circuit structure such that the memory for front side output B912 and the memory for reverse side output B913 are provided in the data selector B91 as buffer memories, and after the front side image data and the reverse side image data are temporarily memorized in the memory for front side output B912 and in the memory for reverse side output B913 respectively, the reverse side image data are first read out. However, the above-mentioned memory in the data selector B91 can be omitted. That is, when the image forming mode such as double-sided copy from single-or-double-sided original is selected in the image forming mode selecting portion B93 in the operation portion B31, the image data of the original on one or both sides are consecutively read and memorized in the memory circuit B26 in the order of pages, and on the occasion of reading-out, the order of reading-out is changed in a manner such as the second page before the first, the fourth page before the third, the sixth page before the fifth, and so on, which enables continuous double-sided image forming. Besides, the change of the image forming mode such as the change from double-sided copying to single-sided and its reverse way can be easily made.

Furthermore, in the case, for example, where the images of the original of A4 size are developed to A3 size, it should properly be made that the top addresses of the required pages of the A4 size original are called out and the image data for the two consecutive pages are read out to be subjected to the expansion processing. By making the image forming apparatus B25 perform the image formation on the basis of such image data as mentioned above, a copy of A3 size on one side of which the copied images of two pages of the original of A4 size are disposed side by side can be obtained easily.

In the meantime, as for the double-sided image forming apparatus as mentioned above, it can be made to function only as a general printer capable of double-sided printing by inputting the image data directly to the image forming portion C from an external apparatus such as a computer, in addition to the image data which are inputted to the image forming portion C through the image reading portion A and the image processing portion B.

Now, in the case where the image data are inputted from an external apparatus and the image forming is made in real time as mentioned above, the inputted image data must be once memorized in a buffer memory in order to adjust the timing of the image data input from the external apparatus with the image forming in the image forming portion C.

However, in the circuit structure, as is mentioned above, provided with the image memory portion B23 (memory circuit B26) for memorizing and storing the image data, it is not favorable for the circuit structure to be provided with separate memory circuits for every different function due to the complication of the memory circuit and the disadvantage that the memory capacity can not be efficiently utilized.

Then, it will be explained in the following the fifth example in which the structure of the memory circuit is simplified by making the aforesaid image memory portion B23 to be capable of being used as a buffer memory when the double-sided image forming apparatus is made to function as a printer for an external apparatus.

Figure 19:
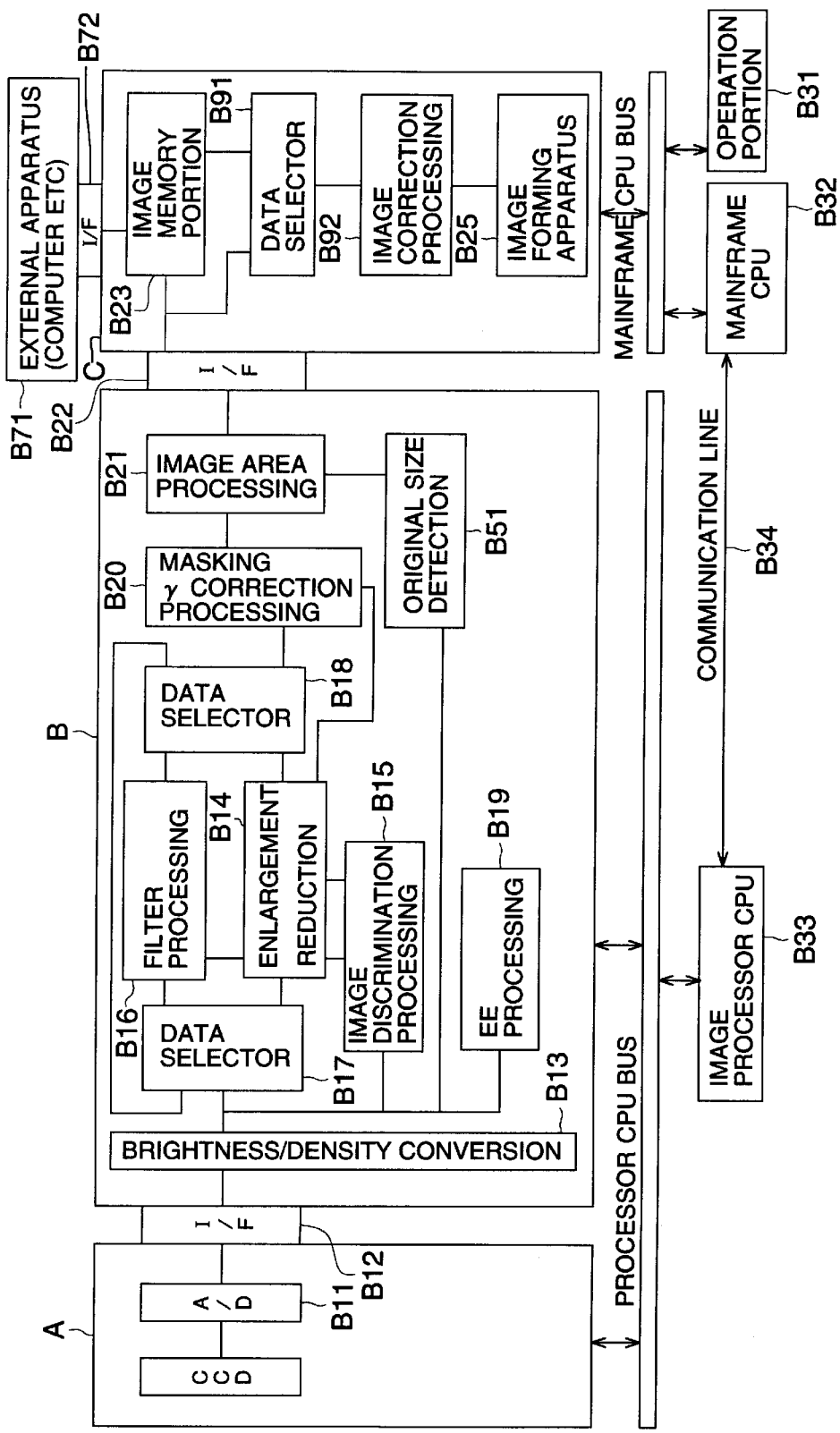
FIG. 19 is a block diagram showing the circuit structure in the fifth example of practice.

In the block diagram of FIG. 19 showing the whole processing circuit in the fifth example of practice of the invention, the image data from the external apparatus B71 such as a computer are made to be inputted in the image forming portion C through the interface B72, and in the image forming apparatus C, said inputted image data through the interface B72 are outputted to the image forming apparatus B25 through the image memory portion B23, data selector B 91, and the image correction processing portion B92.

Figure 20:
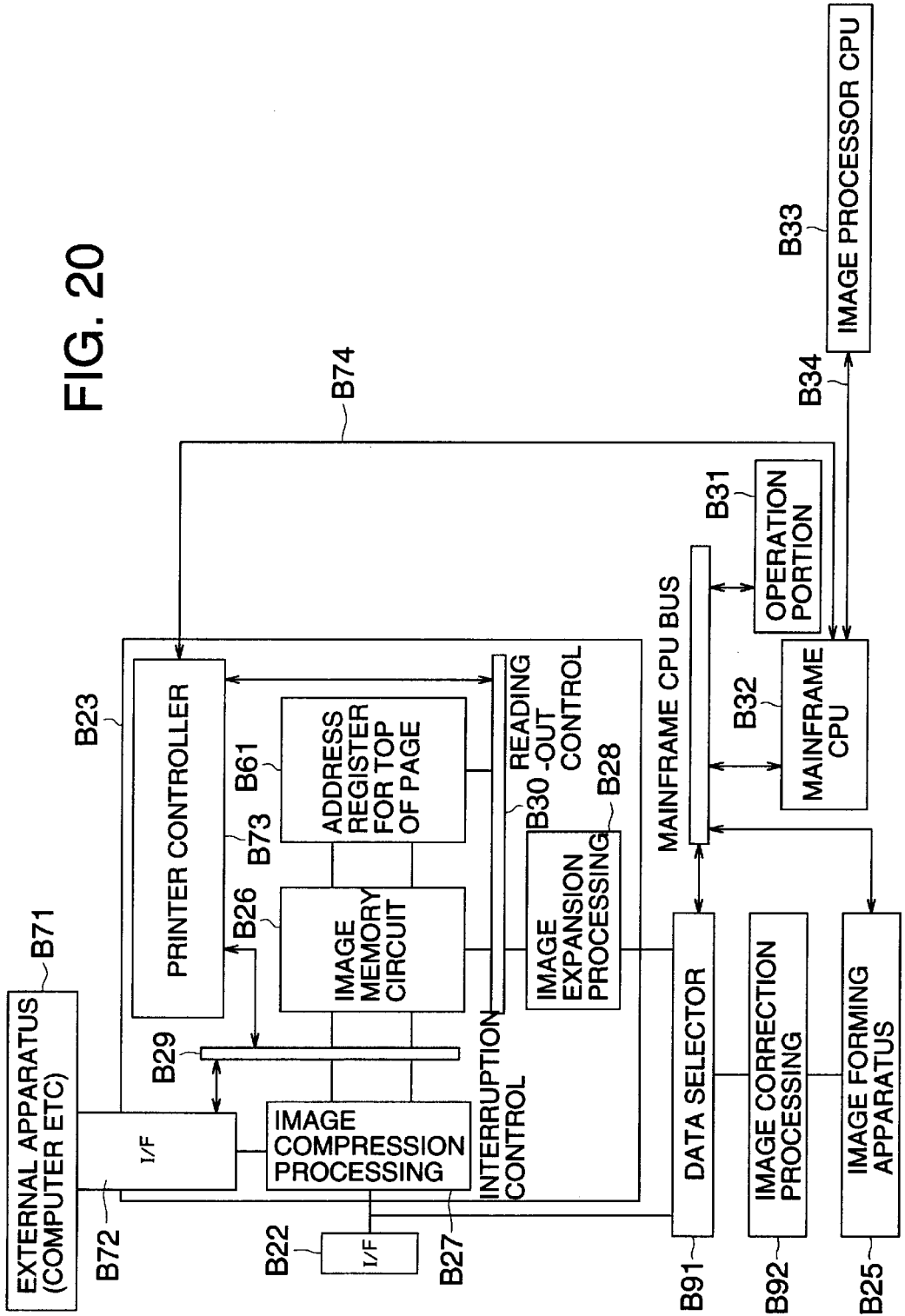
FIG. 20 is a block diagram showing the image memory portion in the fifth example of practice.

Now, the image memory portion B 23 in the above-mentioned circuit structure shown in FIG. 19 is made up as is shown in FIG. 20.

In FIG. 20, to the compression processing portion B27, the image data which are subjected to the image processing in the image processing portion B are to be inputted through the interface B22, and also the image data from the external apparatus B71 are made to be inputted through the interface B72.

The image data from the external apparatus B71, just as the case where the read image data are memorized and stored, are outputted to the data selector B91 through the compression processing portion B27, memory circuit B26, and the expansion processing portion B28; in the circuit structure shown in FIG. 20, a printer controller B73 (the second means for controlling the output) is provided in order to use said memory circuit B26 as a buffer memory.

In the case where the image forming process is made on the basis of the image data inputted from the external apparatus B71, with the aforesaid memory circuit B26 used as a buffer memory, the aforesaid compression processing portion B27 and expansion procession portion B28 are set in the non-compression mode by the controlling function of the main CPU B32 (the first means for controlling the output), and the image data inputted from the external apparatus B71 are written in the memory circuit B 26 kept intact without compression, with the writing process controlled by the printer controller B73.

In this example too, as the above-mentioned example of practice, the memory circuit B26 is made up continuously and the top address of each image memory is made to be memorized in the register B51. By such structure as this, the memory circuit B26 is made to have both the memory area for memorizing and storing the image data and the memory area used as a buffer memory, which makes the memory capacity to be utilized efficiently.

The aforesaid printer controller B73 is connected to the main CPU B32 by the communication line 74, and through the communication with the main CPU, controls the reading-out control circuit B30 in response to the state of the image data input from the external apparatus B71, preceding the control by the data selector B 91, so as to transmit the image data at the best fitted timing in the image forming apparatus B25.

According to the above-mentioned structure, while the image data read by the image reading portion A which is provided also in the image forming apparatus can be memorized and stored in the image memory portion B23, on the occasion of the image forming in real time on the basis of the image data from the external apparatus B71, said image memory portion B23 can be used as a buffer memory, which makes it unnecessary to provide an image memory portion separately for every different function, resulting in a simplified structure.

Further, in the aforesaid structure, the image data inputted from the external apparatus B71 may also be memorized and stored in the image memory portion B23 after compression processing in a manner similar to the case of the read image data.

In addition, as for the aforesaid interface B72, a general type of interface such as the Centronics-based and the SCSI-type may be used.

As has been explained up to now, according to the image forming apparatus of this invention, the read image data can be memorized and stored with a simple circuit structure, and a high-speed processing can be easily made, with the read image data stored, so that the apparatus can quickly cope with the change of the output mode into the double-sided image forming.

Particularly it is easy to follow a change in output format such as change between the single side image formation mode and the both side image formation mode.

Further, in the case where the image data are subjected to the compression processing to be memorized, the aforesaid compression rate can be varied in accordance with the specification by the user, so that the image forming may be made in accordance with the requirement for the high image quality or for the increase of the number of images to be memorized.

Still further, by memorizing only the image data in the effective image area, with the image data in the null image area excepted from the object of memorizing, the memory capacity of the memory circuit for memorizing the image data can be efficiently utilized.

Furthermore, in the case where a real-time image forming is made on the basis of the image data from an external apparatus, the memory circuit provided for memorizing the read image data can be made to function as a buffer memory, hence in addition to the function as a copying machine capable of double-sided image forming, the function as a printer for an external apparatus can be actualized without complication of the memory circuit.

Besides, owing to the structure such that the image data are made to be memorized continuously in the memory circuit while the top address indicating the memory area of each image is made to be separately memorized, the memory capacity of the memory circuit can be efficiently utilized, and the apparatus has further advantages that not only the switching from the single-sided to the double-sided image forming can be made easily and vice versa, but also the change of the output mode, for example, the development of the double-sided image of A4 size to the single-sided A3 size and so forth can be simply and conveniently carried out.

What is claimed is:

1. An image forming apparatus comprising:
    an input device that inputs an output mode with respect to how images are to be formed;
    an image reader that successively reads images from at least one of single-sided documents and both-sided documents, and that produces image data corresponding to the read images;
    an image processor that processes the image data produced by the image reader;
    a memory that stores the image data processed by the image processor;
    a selector that portions out the image data in the memory into first side image data and second side image data in accordance with the output mode input by the input device;
    an image corrector that conducts a first side correction operation with respect to the first side image data to produce first side output image data, and that conducts a second side correction operation with respect to the second side image data to produce second side output image data, said second side correction operation being different from said first side correction operation;
    an image carrying member;
    an intermediate image carrying member;
    a toner image forming device that forms on the image carrying member a first side toner image based on the first side output image data and a second side toner image based on the second side output image data;
    a transfer device that: (i) transfers the second side toner image from the image carrying member to the intermediate image carrying member, (ii) transfers the first side toner image from the image carrying member to a first side of a recording sheet, and (iii) transfers the second side toner image from the intermediate image carrying member to a second side of the recording sheet; and
    a fixing device that fixes the first side toner image and the second side toner image on the recording sheet simultaneously.

2. The apparatus of claim 1, wherein the second side correction operation is different in $\gamma$ correction from the first side correction operation.

3. The apparatus of claim 1, wherein the second side correction operation is different in color correction from the first side correction operation.

4. The apparatus of claim 1, wherein one of the first side correction operation and the second side correction operation includes a mirror image converting process.

5. The apparatus of claim 1, wherein the image processor processes the image data produced by the image reader with a common image processing condition.

6. The apparatus of claim 1, wherein the image reader produces image data indicating a density level of the read images.

7. The apparatus of claim 1, wherein the image processor conducts space filter processing.

8. The apparatus of claim 1, further comprising a document image discriminator, and wherein the image processor selects an image processing condition in accordance with a discrimination result output by the document image discriminator.

9. The apparatus of claim 8, wherein the document image discriminator discriminates a letter image and a photographic image.

10. The apparatus of claim 1, further comprising:
    an effective image area detector that detects an effective image area from the image data read by the image reader; and
    an effective image area extractor that extracts only image data in the effective image area from the image data read by the image reader; and
    wherein the memory stores only the image data in the effective image area extracted by the effective image area extractor.

11. The apparatus of claim 10, wherein the effective image area detector detects the effective image area base on at least one of a document size and a recording sheet size.

12. The apparatus of claim 10, wherein the effective image area extractor extracts only the image data in the effective image area by comparing coordinate data of pixel positions of the read image data with defined coordinate data corresponding to the effective image area.

13. The apparatus of claim 1, further comprising a compression processor that compresses the image data read by the image reader, and wherein the memory stores the compressed image data.

14. The apparatus of claim 13, wherein the compression processor compresses the image data after processing of the image data by the image processor.

15. The apparatus of claim 13, further comprising an expansion processor that expands the compressed image data stored in the memory.

16. The apparatus of claim 13, further comprising a compression rate designator that designates a compression rate, and a compression rate changer that adjustably sets a compression rate of the compression processor in accordance with the compression rate designated by the compression rate designator.

17. The apparatus of claim 16, wherein the compression rate designator designates one of a standard compression rate mode that utilizes a standard compression rate, an image quality priority mode that prioritizes image quality by reducing the compression rate to be lower than the standard compression rate, and a compression rate priority mode that prioritizes the compression rate by increasing the compression rate to be higher than the standard compression rate.

18. The apparatus of claim 17, wherein the standard compression rate mode is designated with a higher priority than the image quality priority mode and the compression rate priority mode.

19. The apparatus of claim 16, wherein the compression rate designator designates numeric data of the compression rate.

20. The apparatus of claim 1, further comprising an image data input device that inputs image data from an external apparatus, and wherein the memory stores the image data inputted by the image data input device and the toner image forming device forms the toner images based on the image data stored in the memory.

21. The apparatus of claim 20, wherein a memory section of the memory is used as a common memory section for both the image data read by the image reader and processed by the image processor and the image data inputted from the external apparatus.

22. The apparatus of claim 1, wherein the memory is adapted to successively store plural image data.

23. The apparatus of claim 20, further comprising a storing device that stores memory region data indicating a memory region of each image data in the memory, and wherein each image data is selectively read from the memory based on the memory region data stored in the memory region data storing device.

24. The apparatus of claim 23, wherein the memory region data comprises a leading address of each image data in the memory.

25. The apparatus of claim 23, wherein the plural image data are successively read in accordance with the memory region data.

* * * * *